United States Patent
Kotaru et al.

(10) Patent No.: US 12,513,728 B2
(45) Date of Patent: Dec. 30, 2025

(54) OPTIMIZATION OF GUARD BANDS IN MULTI-NUMEROLOGY 5G NETWORKS

(71) Applicant: Microsoft Technology Licensing, LLC, Redmond, WA (US)

(72) Inventors: Manikanta Kotaru, Kenmore, WA (US); Arjun Varman Balasingam, Cambridge, MA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 18/335,700

(22) Filed: Jun. 15, 2023

(65) Prior Publication Data

US 2024/0422813 A1    Dec. 19, 2024

(51) Int. Cl.
*H04W 72/541* (2023.01)
*H04L 27/26* (2006.01)
*H04W 24/02* (2009.01)
*H04W 72/0457* (2023.01)
*H04W 72/542* (2023.01)

(52) U.S. Cl.
CPC ..... *H04W 72/541* (2023.01); *H04L 27/26025* (2021.01); *H04L 27/2607* (2013.01); *H04W 24/02* (2013.01); *H04W 72/0457* (2023.01); *H04W 72/542* (2023.01)

(58) Field of Classification Search
None
See application file for complete search history.

(56) References Cited

U.S. PATENT DOCUMENTS

| 2019/0379488 A1 | 12/2019 | Demir | |
| 2022/0104059 A1* | 3/2022 | Hu | H04W 24/02 |
| 2022/0330274 A1* | 10/2022 | Zhou | H04L 5/0094 |

(Continued)

FOREIGN PATENT DOCUMENTS

| EP | 4319258 A1 * | 2/2024 | H04W 24/08 |

OTHER PUBLICATIONS

International Search Report and Written Opinion received for PCT Application No. PCT/US2024/033466, Oct. 11, 2024, 16 pages.

(Continued)

*Primary Examiner* — Anh Vu H Ly
(74) *Attorney, Agent, or Firm* — ArentFox Schiff LLP

(57) ABSTRACT

The present optimization of guard bands repurposes some guard band spectrum for data transmission in a 5G network. This approach takes spectrum that is otherwise "wasted" for guard bands to enable overall spectrum utilization to be increased. To mitigate effects of inter-numerology interference (INI) with narrower guard band bandwidth, physical resource blocks (PRBs) for particular user equipment (UE) are allocated to BWPs that are modified with increased bandwidth that comes from narrowing the guard band bandwidth. These particular UEs have high signal strength, for example, as characterized by SINR (signal-to-interference plus noise ratio), relative to other UE. Allocating PRBs for high signal strength UE in BWPs near the edges of the narrower guard band increases the risk of INI, but the higher signal strength for these UE helps to lessen the INI impact and enable overall throughput for all users to be maximized in the network.

20 Claims, 21 Drawing Sheets

(56) References Cited

U.S. PATENT DOCUMENTS

2024/0275652 A1* 8/2024 Saggar ............... H04L 27/2646
2024/0373411 A1* 11/2024 Mansour ........... H04W 72/0457

OTHER PUBLICATIONS

Kumbhkar, et al., Impact of asynchronous transmissions in noncontiguous OFDMAH, In Proceedings of IEEE International Symposium on Dynamic Spectrum Access Networks (DYSPAN), Mar. 6, 2017, pp. 1-9.

* cited by examiner

Table 5.3.3-1: Minimum guardband for each UE channel bandwidth and SCS (kHz)

| SCS (kHz) | 5 MHz | 10 MHz | 15 MHz | 20 MHz | 25 MHz | 30 MHz | 35 MHz | 40 MHz | 45 MHz | 50 MHz | 60 MHz | 70 MHz | 80 MHz | 90 MHz | 100 MHz |
|---|---|---|---|---|---|---|---|---|---|---|---|---|---|---|---|
| 15 | 242.5 | 312.5 | 382.5 | 452.5 | 522.5 | 592.5 | 572.5 | 552.5 | 712.5 | 692.5 | N/A | N/A | N/A | N/A | N/A |
| 30 | 505 | 665 | 645 | 805 | 785 | 945 | 925 | 905 | 1065 | 1045 | 825 | 965 | 925 | 885 | 845 |
| 60 | N/A | 1010 | 990 | 1330 | 1310 | 1290 | 1630 | 1610 | 1590 | 1570 | 1530 | 1490 | 1450 | 1410 | 1370 |

1400

OPTIMIZATION OF GUARD BANDS IN MULTI-NUMEROLOGY 5G NETWORKS

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile operators (MOs) will be under real pressure from enterprise customers to move quickly, delivering 5G's low latency, dense device, and high-performance capabilities to enable near real-time management and control of critical business operations. While 5G networks provide for the co-existence of heterogenous services and users, boosting transmission throughput is typically a common goal for MOs.

SUMMARY

In an illustrative embodiment, guard bands in multi-numerology 5G networks are optimized by implementing a variably-sizable guard band between bandwidth parts (BWPs) utilized for data transmissions for user equipment (UE) in the network. Each BWP comprises respective subcarriers and time slots described by a different numerology. Signal-to-interference plus noise ratio (SINR) measurements for the data transmissions of the UE are received and utilized to derive throughput for the 5G network for different combinations of physical radio block (PRB) allocations for the UE within the BWPs and guard band size. Using the derived throughput, the size of the guard band is set and PRBs are scheduled for the UE in the BWPs to maximize the throughput.

In another illustrative embodiment, a guard band is implemented between groups of subcarriers that are utilized for data transmissions of UE in a mobile communications network. The guard band is configurable with a standard bandwidth or a narrower optimized bandwidth. Measured SINR values for UE data transmissions are obtained and utilized to estimate throughput for the network for different combinations of PRB allocations to the groups of subcarriers and guard band bandwidth. Using the SINR measurements and estimated throughput, PRBs are allocated to subcarriers having a frequency range falling within the standard bandwidth of the guard band to thereby configure the guard band with the narrower optimized bandwidth.

In another illustrative embodiment, different BWPs are utilized to support allocation of PRBs for data transmissions between UE and a radio unit (RU) in a 5G network, in which each BWP is described by a different numerology. A radio access network (RAN) in the 5G network is operated to collect SINR measurements applicable to the data transmissions. The collected SINR measurements are used to estimate throughput of the 5G network for different combinations of PRB allocation and a size of a guard band between the BWPs. Data transmissions for the UE are scheduled using a combination of PRB allocation and guard band size that is estimated to maximize data transmission throughput of the network.

Optimization of guard bands in multi-numerology 5G networks advantageously enables allocation of radio spectrum to meet the demands of different and non-heterogenous users and services while maximizing network throughput. The present guard band optimization enables guard band bandwidth to be repurposed for data transmission while minimizing the effects of inter-numerology interference (INI) that can typically occur in multi-numerology systems due to loss of orthogonality that occurs with subcarriers in different numerologies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 10 shows an illustrative example of standard guard band bandwidths as described in 3rd Generation Partnership Project (3GPP) TS 38.101-1 V18.1.0 (2023 March);

Like reference numerals indicate like elements in the drawings. Elements are not drawn to scale unless otherwise indicated.

DETAILED DESCRIPTION

Figure 1:
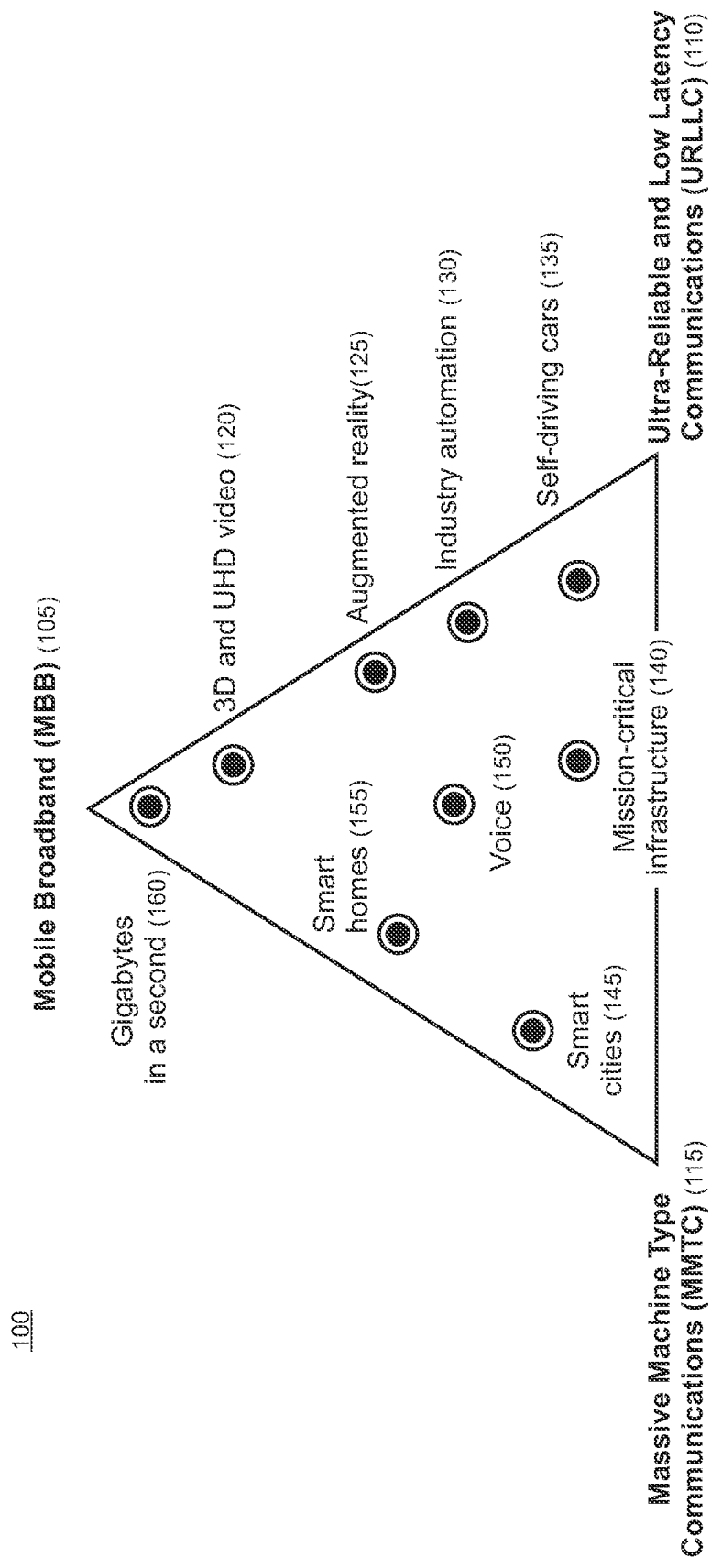
FIG. 1 shows illustrative 5G network usage scenario footprint examples.

Disclosed are methods, computer-readable memory devices, and computing devices that are arranged to implement optimization of guard bands utilized in multi-numerology networks, such as 5G networks. The ability to use multiple numerologies, in which subcarrier spacing, symbol length, and cyclic prefix are optimizable to particular service types within the same frequency band, is a fundamental differentiating feature provided by NR (new radio) technology in 5G compared to legacy 4G networks. With the increasing demand for wireless data, 5G networks need to support a wide range of services each with unique data rate, latency, and reliability needs. The flexibility afforded by multi-numerology 5G networks not only enhances user experiences, but also improves overall network capacity and performance.

5G networks support diverse services over a unified physical layer by dividing available system bandwidth into bandwidth parts (BWPs) each having a distinct numerology. However, the use of multiple numerologies in the same frequency band typically introduces non-orthogonality to the network and causes inter-numerology interference (INI) because subcarriers associated with different numerologies are not orthogonal to each other. To reduce INI, guard bands, which act as a buffer between subcarriers in BWPs having different numerologies, are conventionally utilized.

The present optimization of guard bands repurposes some guard band spectrum for data transmission in the 5G network. This approach takes spectrum that is otherwise "wasted" for guard bands and enables overall spectrum utilization to be increased. To mitigate the effects of INI with narrower guard band bandwidth, physical resource blocks (PRBs) for particular user equipment (UE) are allocated to BWPs that are modified with increased bandwidth that comes from narrowing the guard band bandwidth. These particular UE have high signal strength, for example, as characterized by SINR (signal-to-interference plus noise ratio), relative to other UE. Allocating PRBs for the high signal strength UE at locations in BWPs near the edges of narrower guard band increases the risk of INI, but the higher signal strength helps to lessen the INI impact and enable overall throughput for all the users to be maximized in the network.

In an illustrative example, a guard band optimizer is instantiated as a new functional element in a near-real-time RAN (radio access network) intelligent controller (near-RT RIC). The near-RT RIC is an architectural element described, for example, by literature published by the O-RAN (Open RAN) Alliance. The guard band optimizer in the near-RT RIC is configured to receive SINR that is measured for UE data transmissions by suitable RAN elements (e.g., a gNB) and sent over an E2 interface.

The guard band optimizer implements an algorithm that analytically derives network throughput, based on the SINR measurements, for different combinations of PRB allocations (i.e., placement of PRBs within a channel bandwidth) and guard band bandwidth (i.e., guard band size). That is, the guard band optimizer estimates the PRB allocations resulting in highest throughput for different guard band sizes. The guard band optimizer uses the estimated PRB allocation and guard band size providing highest throughput to schedule data transmission by communicating over the E2 interface to a MAC (medium access control)-based scheduler located in a distributed unit (DU) in the RAN.

The discussion that follows provides background and context for the inventive concepts disclosed herein. 5G mobile networks utilize a service-based architecture that supports data connectivity and services enabling deployments using techniques such as, for example, Network Function Virtualization (NFV), Software Defined Networking (SDN), and cloud computing. An exemplary feature and concept of 5G networking includes separating User Plane (UP) functions from Control Plane (CP) functions allowing independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario examples 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), a very high traffic capacity is needed, while the requirement for mobility is typically low and user data rate is higher than that of wide-area coverage. For the wide area coverage case, seamless coverage and medium to high mobility are desired, with much improved user data rate— 20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario 115 may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or predefined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized, as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance requirements of a particular service class or application that may meet some predefined service level agreement (SLA). Each portion of the 5G network is respectively sliced such that the network can be viewed as being composed of air interface slices, RAN slices, mobile core slices, cloud slices, etc. 5G network slicing thus enables creation of multiple logical and secure networks that are isolated from each other, but which span over the same common physical network infrastructure.

Figure 2:
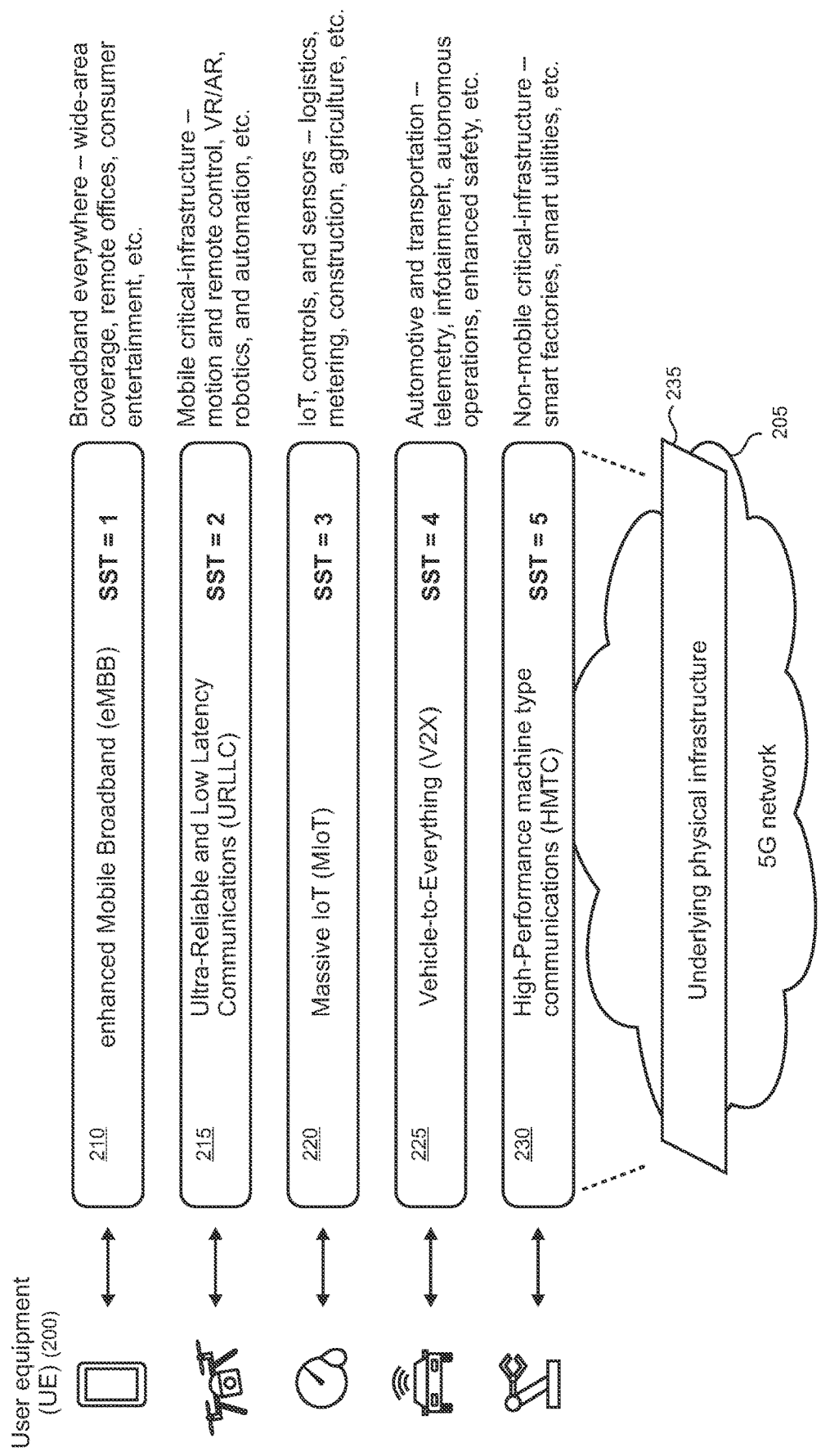
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. 3GPP also defines additional standardized SST values for V2X (Vehicle-to-Everything) (SST=4) and HMTC (High-Performance Machine Type Communications) (SST=5). It may be appreciated that slice service types beyond those having standardized SST values can be defined.

The five standardized service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created over common underlying physical infrastructure 235. Network slicing allows the 5G network operator to provide dedicated logical networks (i.e., network slices) with customer specific functionality. The 5G architecture enables different network configurations in different network slices.

FIG. 2 shows user equipment (UE) 200 that may be representative of the wide variety of device types that may utilize 5G networking, including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote-control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
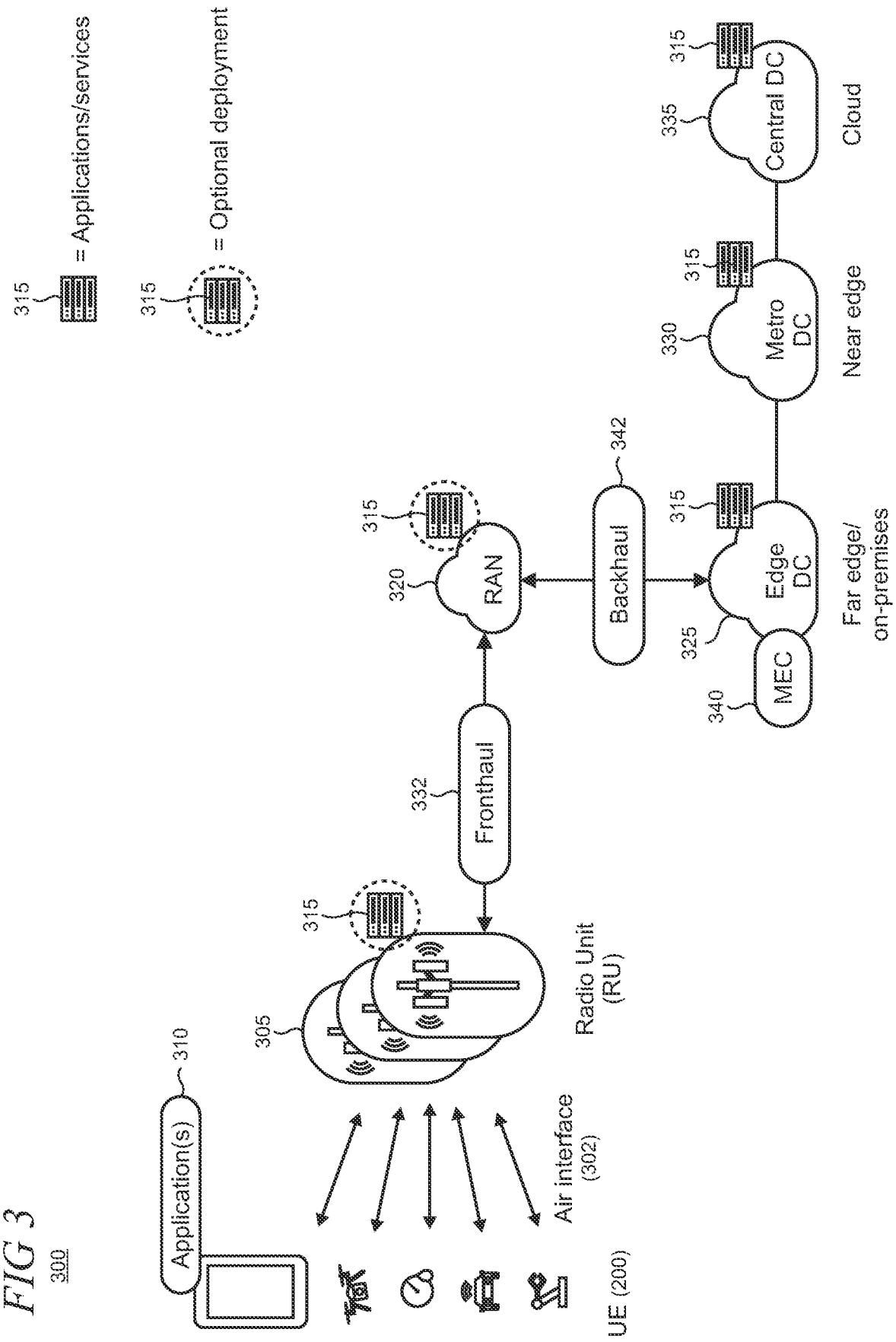
FIG. 3 shows illustrative physical infrastructure in a 5G network architecture.

FIG. 3 shows illustrative physical infrastructure in a 5G network architecture 300. Multiple instances of a radio unit (RU) 305 are configured to interact with a diverse population of UE 200. Each UE typically includes one or more local applications 310 or client-side software/firmware component that is arranged to interface with one or more remote application servers, service providers, or other resources (collectively indicated by reference numeral 315) and thus require network connectivity to such remote facilities.

The RUs are coupled by the mobile fronthaul 332 to a RAN 320. The RAN is coupled by the mobile backhaul 342 to one or more datacenters (DCs). In this illustrative example, the DCs comprise an edge DC 325, a metro DC 330, and a central DC 335. In some 5G networking literature, the edge DC is referred to as a far edge or on-premises DC. The metro DC may be referred to as a near edge DC, and the central DC may be referred to as the cloud. In some implementations, the edge DC may support multi-access edge computing (MEC) functions 340.

The application servers 315 can be located at various points in the network architecture 300 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 320 or RU 305, as indicated by the dashed circles in FIG. 3.

Figure 4:
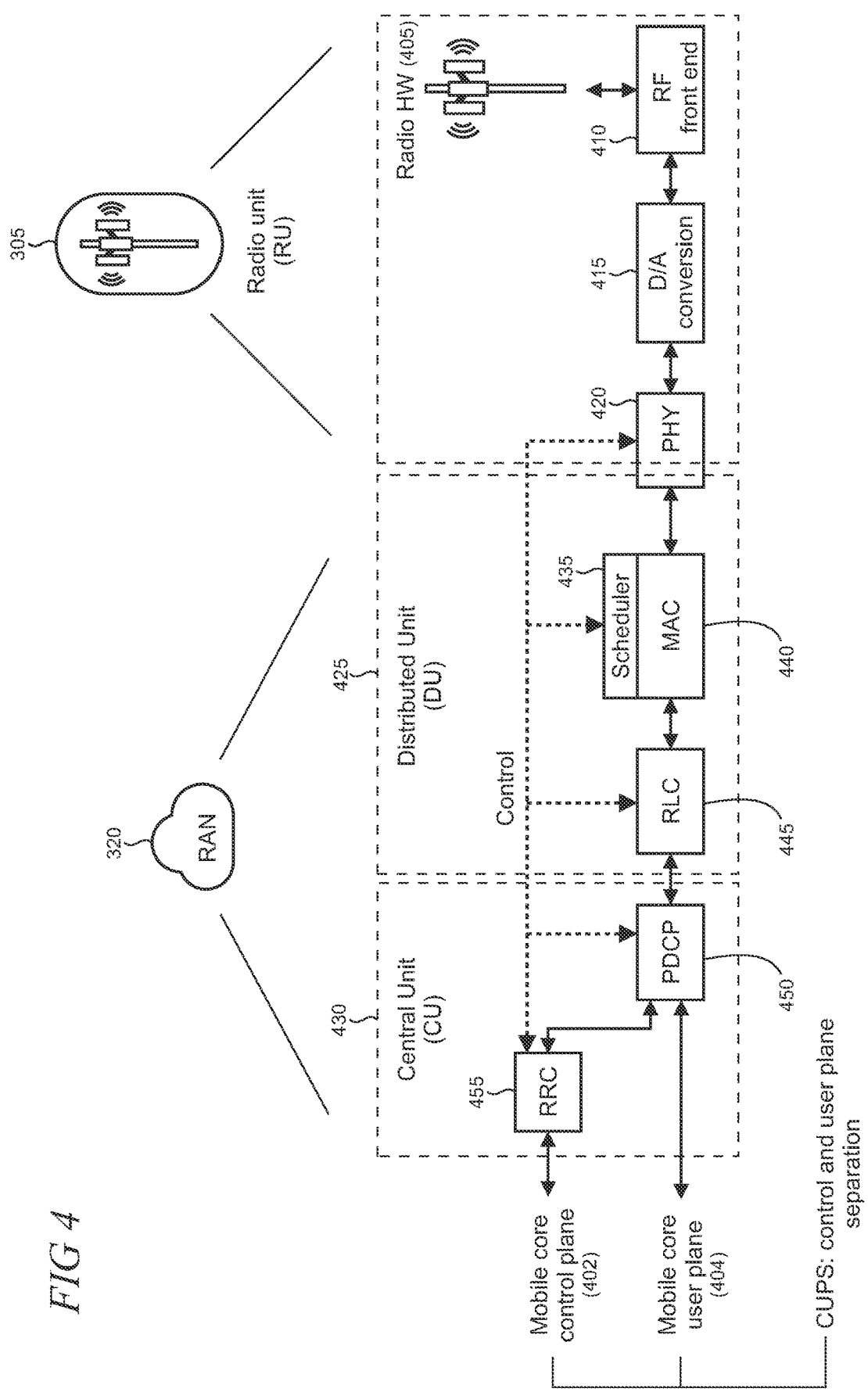
FIG. 4 shows an illustrative 5G radio access network (RAN) and radio unit (RU)

FIG. 4 shows functional blocks of the RAN 320 and RU 305. The RU comprises radio transmission points, for example, radio hardware (HW) 405 such as antennas and other suitable hardware, which handles radio communications with the UE. The radio hardware is serially coupled to a radio frequency (RF) front end 410, a digital to analog (D/A) conversion unit 415, and a portion of the functionality of the physical (PHY) layer 420 as described in the OSI Open Systems Interconnection model.

Under 3GPP and O-RAN (Open Radio Access Network) Alliance, the processing pipeline of the RAN 320 is split into a distributed unit (DU) 425 and a central unit (CU) 430. The DU is responsible for real-time layers 1 and 2 (L1 and L2) scheduling functions, and the CU is responsible for non-real-time, higher L2 and L3 functions. Accordingly, the DU comprises a scheduler 435 located on top of a MAC (Medium Access Control) layer component 440, an RLC (radio link control) layer component 445, and parts of a PHY (physical) layer component 420. The MAC layer component is responsible for buffering, multiplexing and demultiplexing segments, including all real-time scheduling decisions regarding which segments are transmitted when. It is also able to make a "late" forwarding decision (i.e., to alternative carrier frequencies, including Wi-Fi, for example). The PHY layer component is responsible for coding and modulation.

The CU 430 is configured with a PDCP (Packet Data Convergence Protocol) layer component 450 and RRC (Radio Resource Control) layer component 455. The PDCP layer component is responsible for compressing and decompressing IP (Internet protocol) headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the mobile core control plane 402 while the PDCP layer component interfaces with the user plane 404 to thereby implement the "CUPS" (control and user plane separation) feature of 5G.

Figure 5:
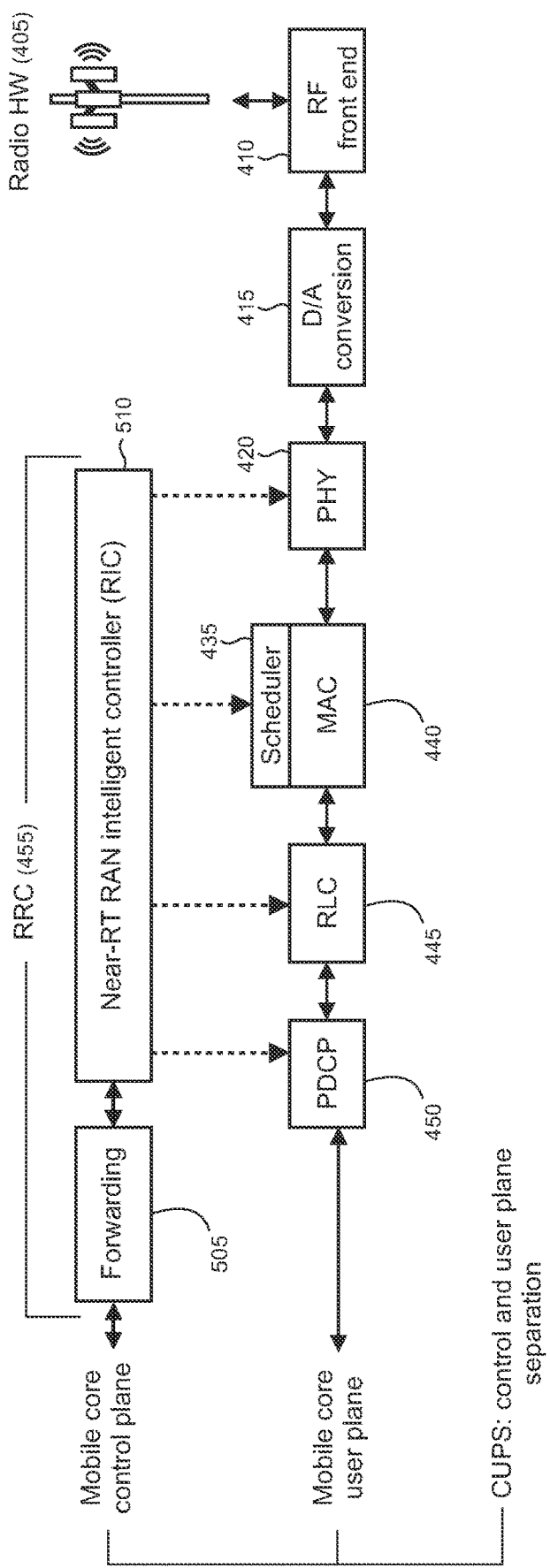
FIG. 5 shows an illustrative radio resource control (RRC) that is disaggregated into a mobile core-facing control plane component and a near-real-time RAN intelligent controller (near-RT RIC)

FIG. 5 shows that the RRC layer component 455 as disaggregated into a mobile core-facing control plane forwarding component 505 and a near-real-time (RT) RAN intelligent controller (RIC) 510. The RRC layer component is thus responsible for only near-real-time configuration and control decision making, while the scheduler 435 on the MAC component 440 is responsible for real-time scheduling.

Figure 6:
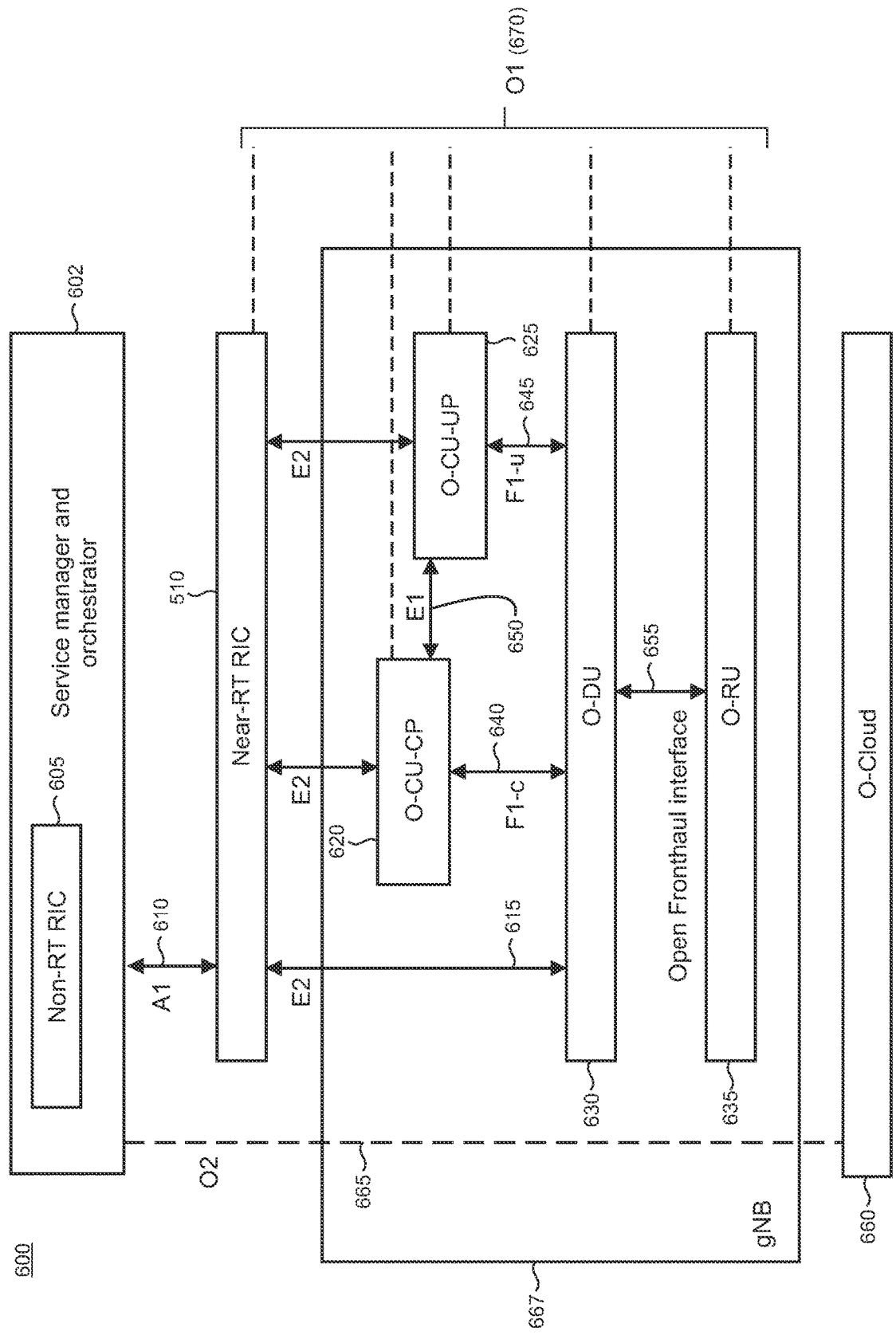
FIG. 6 shows an illustrative RAN operations and maintenance (OAM) logical architecture as described by the O-RAN (Open Radio Access Network) Alliance.

FIG. 6 shows an illustrative RAN operations and maintenance (OAM) logical architecture 600, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 605 may be incorporated into a service manager and orchestrator 602. The non-RT RIC interoperates with a near-RT RIC 510 through an A1 interface 610.

The near-RT RIC 510 is coupled over an E2 interface 615 with network functions for radio access control and optimization including the O-CU-CP (O-RAN Central Unit-Control Plane) 620, O-CU-UP (O-RAN Central Unit-User Plane) 625, and O-DU 630 which collectively form a gNB 667, as shown. The O-CU-CP and O-CU-UP are respectively coupled to the O-DU over F1-c and F1-u interfaces, 640 and 645, as defined and maintained by 3GPP. The O-CU-CP is coupled to the O-CU-UP over a 3GPP E1 interface 650. The O-DU and O-RU 635 are coupled using an Open Fronthaul interface 655 (also known as a lower layer split (LLS) interface).

The O-Cloud 660 is a cloud computing platform comprising a collection of physical infrastructure nodes that meet O-RAN requirements to host the relevant O-RAN functions (i.e., near-RT RIC, O-CU-CP, 0-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 602 over the O2 interface 665. An O1 interface 670 is provided to each of the near-RT RIC, O-CU-CP, O-CU-UP, O-DU, and O-RU, as shown in FIG. 6.

Figure 7:
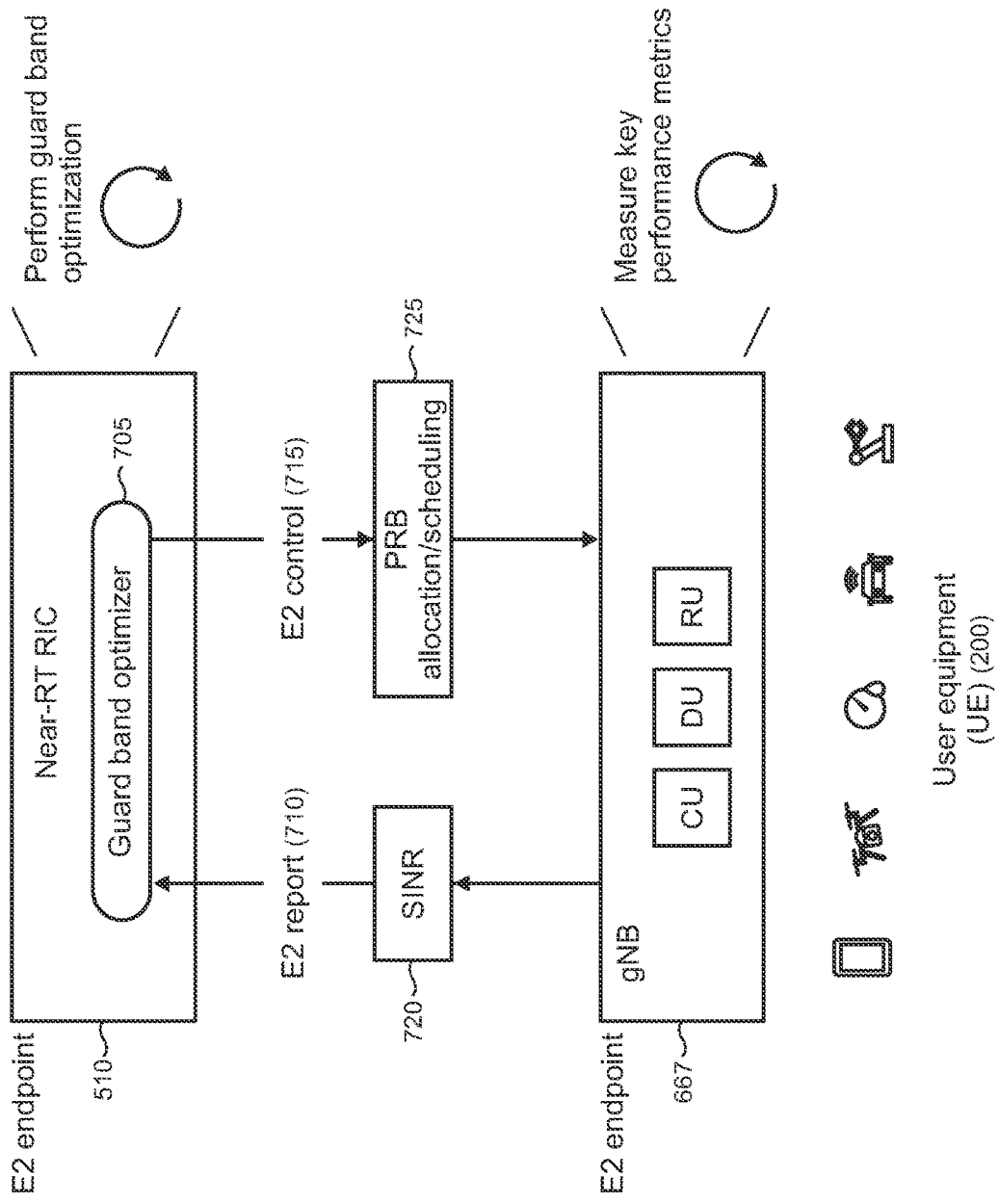
FIG. 7 shows an illustrative guard band optimizer that is implemented in a near-RT RIC.

The present optimization of guard bands in multi-numerology 5G networks is implemented, in an illustrative example, using a guard band optimizer 705 that is instantiated as a new functional element in the near-RT RIC 510, as shown in FIG. 7. The guard band optimizer establishes communications over an E2 interface with the gNB 667 in which each component essentially functions as an E2 endpoint. The particular implementation of the E2 interface can vary by application and use case. In this illustrative example, the E2 interface is implemented using an E2 report interface 710 and an E2 control interface 715 which are currently described by applicable O-RAN literature. Elements in the gNB 667 are configured to dynamically measure SINR on a per user/UE basis and send the measured SINR values 720 to the guard band optimizer 705 over the E2 report interface.

Figure 11:
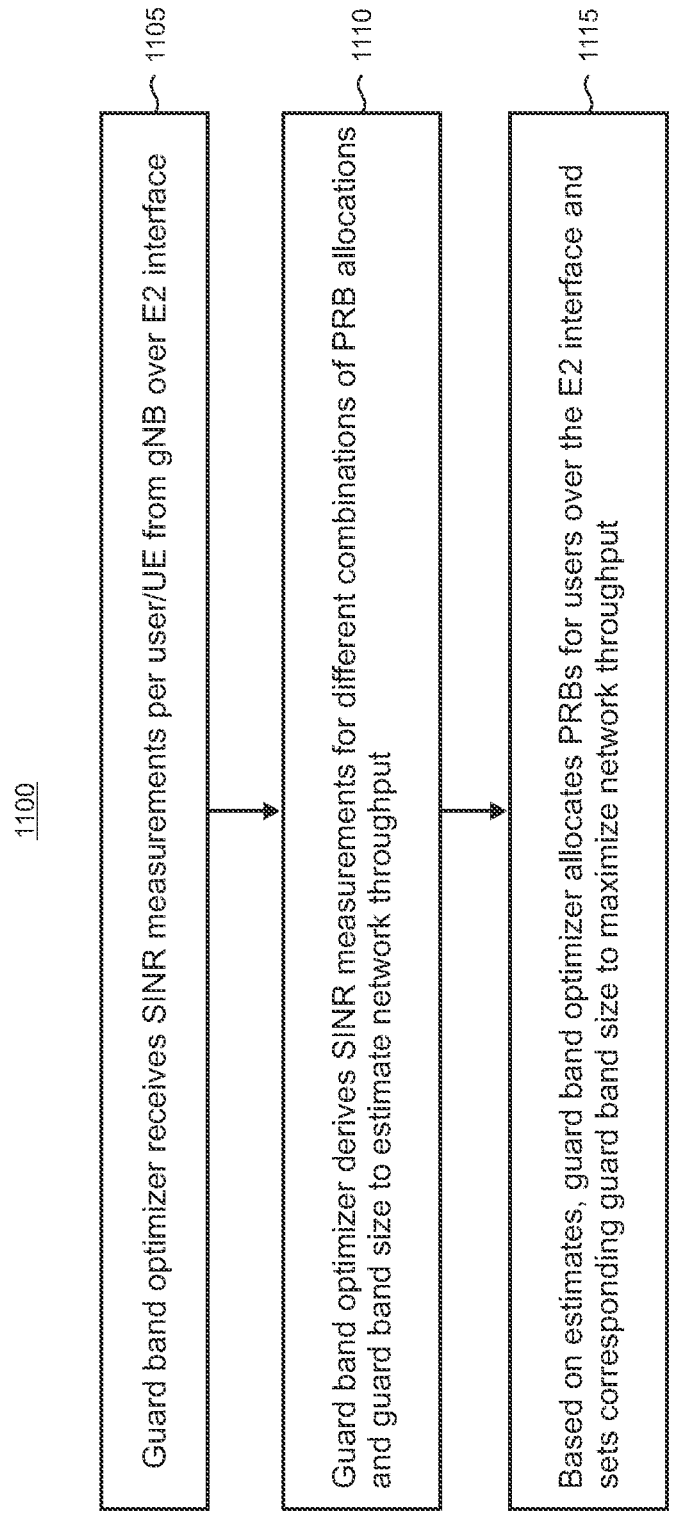
FIG. 11 is a flowchart showing an illustrative algorithm for optimizing guard bands based on signal-to-interference plus noise ratio (SINR) measurements made at a gNB.

The guard band optimizer 705 is configured to perform a guard band optimization algorithm, as shown in FIG. 11 and discussed in the accompanying text below, and apply the results of the optimization to control allocation and scheduling of PRBs in appropriate BWPs using a control signal 725 that is transmitted to the gNB over the E2 control interface 715.

Figure 8:
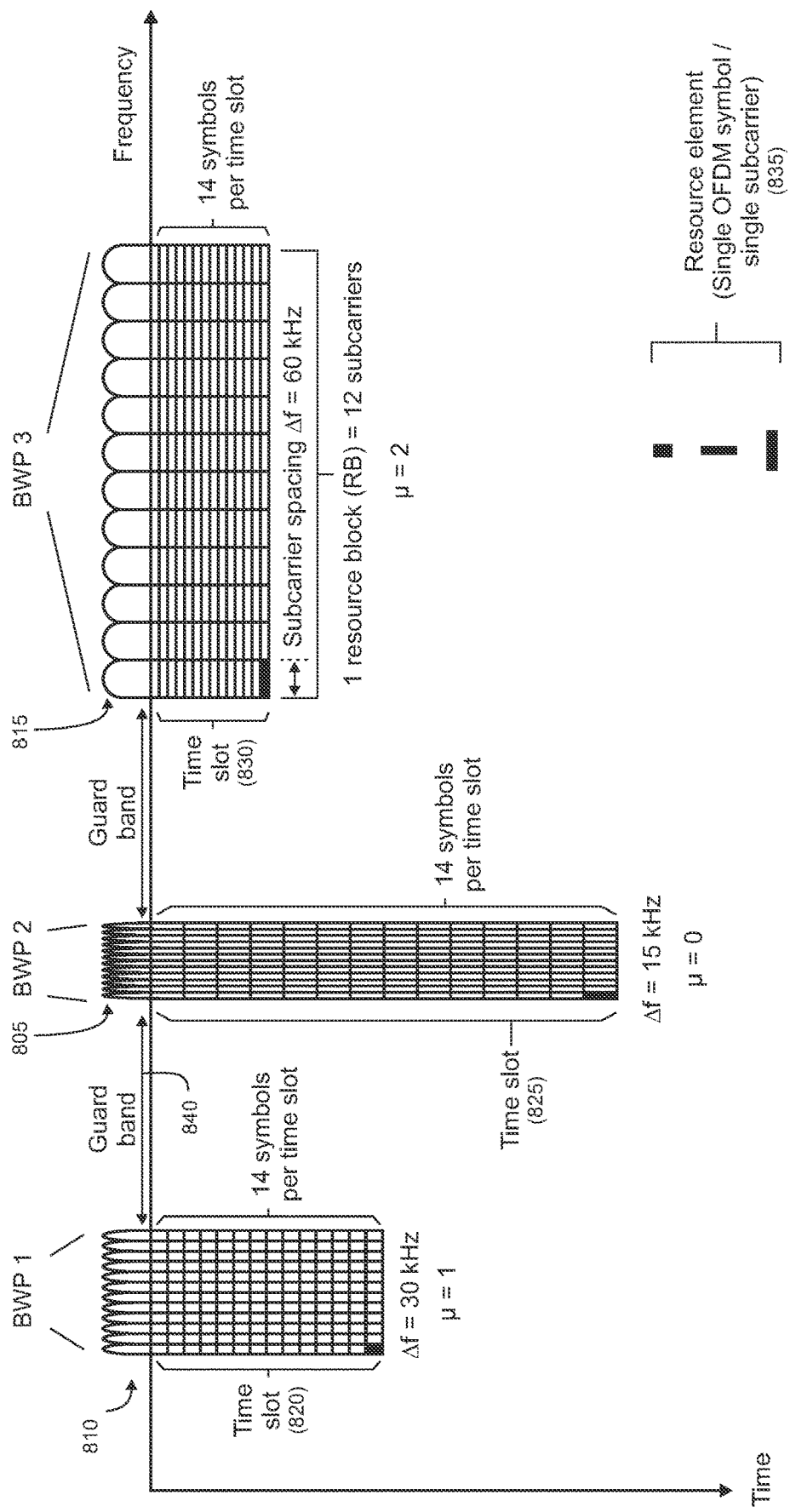
FIG. 8 shows illustrative bandwidth parts (BWPs) associated with respective numerologies.

Each numerology is associated with a BWP that has various parameters including subcarrier spacing, OFDM (orthogonal frequency-division multiplexing) symbol duration, and cyclic prefix (CP) length. A BWP is a contiguous set of PRBs for a given carrier. The PRBs are selected from a contiguous subset of common PRBs for a given numerology, $\mu$. FIG. 8 shows illustrative BWPs 805, 810, and 815 associated with respective numerologies, $\mu=0$, 1, and 2. Frequency is shown on the horizontal axis and time is shown on the vertical axis.

It may be appreciated that a wider bandwidth may have a direct impact on the peak and user experienced data rates, however users are not always demanding high data rates. The use of wide bandwidth may imply higher idling power consumption both from RF and baseband signal processing perspectives in some cases. Thus, the concept of BWP has been introduced in 5G to thereby operate UEs with smaller bandwidth than the configured channel bandwidth, which enables the 5G air interface to be efficient while still supporting wideband operations. BWPs provide flexibility so that multiple, different signal types can be sent in a given bandwidth. Most gNBs can utilize the wider bandwidths available in 5G. UE capabilities, however, can be expected to vary and it will be more challenging for some UEs to use the larger available bandwidths. BWPs enable multiplexing of different signals and signal types for better utilization of spectrum.

Per 3GPP release 15, a given UE can be configured with a maximum of four BWPs for downlink and uplink, but at a given point in time, only one BWP is active for downlink and one for uplink. The BWP concept enables UEs to operate in narrow bandwidth and when a user demands more data (e.g., for bursts of traffic) it can inform the RU to enable wider bandwidth. In typical situations, UEs are expected to receive and transmit only within the frequency range configured for the active BWPs with the associated numerologies.

As shown in FIG. 8, each BWP 805, 810, and 815 has a different subcarrier spacing. In 5G, subcarrier spacings of 15 kHz ($\mu$=0), 30 kHz ($\mu$=1), 60 kHz ($\mu$=2), 120 kHz ($\mu$=3), and 240 kHz ($\mu$=4) are supported. Downlink and uplink transmissions are organized into frames with 10 ms duration, each consisting of ten subframes of 1 ms. Each frame is divided into two equally-sized half-frames of five subframes each with half-frame 0 consisting of subframes 0-4 and half-frame 1 consisting of subframes 5-9. In Total, there are 10 subframes in one frame.

The lengths of the respective time slots 820, 825, and 830 are different depending on different subcarrier spacing with slot length getting shorter as subcarrier spacing gets wider. The number of time slots per subframe varies with carrier spacing—with 1, 2, 4, 8, or 16 slots per subframe. Physical radio resources are depicted in FIG. 8 by the filled rectangles which represent the smallest unit of resource—the resource element 835—which comprises a single OFDM symbol and a single subcarrier.

The utilization of mixed numerologies in 5G provides additional flexibility to efficiently serve requirements of diverse usage scenarios. However, INI can arise between multiplexed numerologies. INI can cause, for example, a loss of orthogonality among subcarriers of different numerologies in the frequency domain and may cause difficulties in OFDM symbol alignment in the time domain. Controlling and reducing INI may typically be performed using one or more techniques including, for example, windowing and filtering. Guard bands (representatively indicated by reference numeral 840 in FIG. 8) may also be inserted between adjacent sub-bands utilizing different numerologies to minimize the effects of INI in the system.

Figure 9:
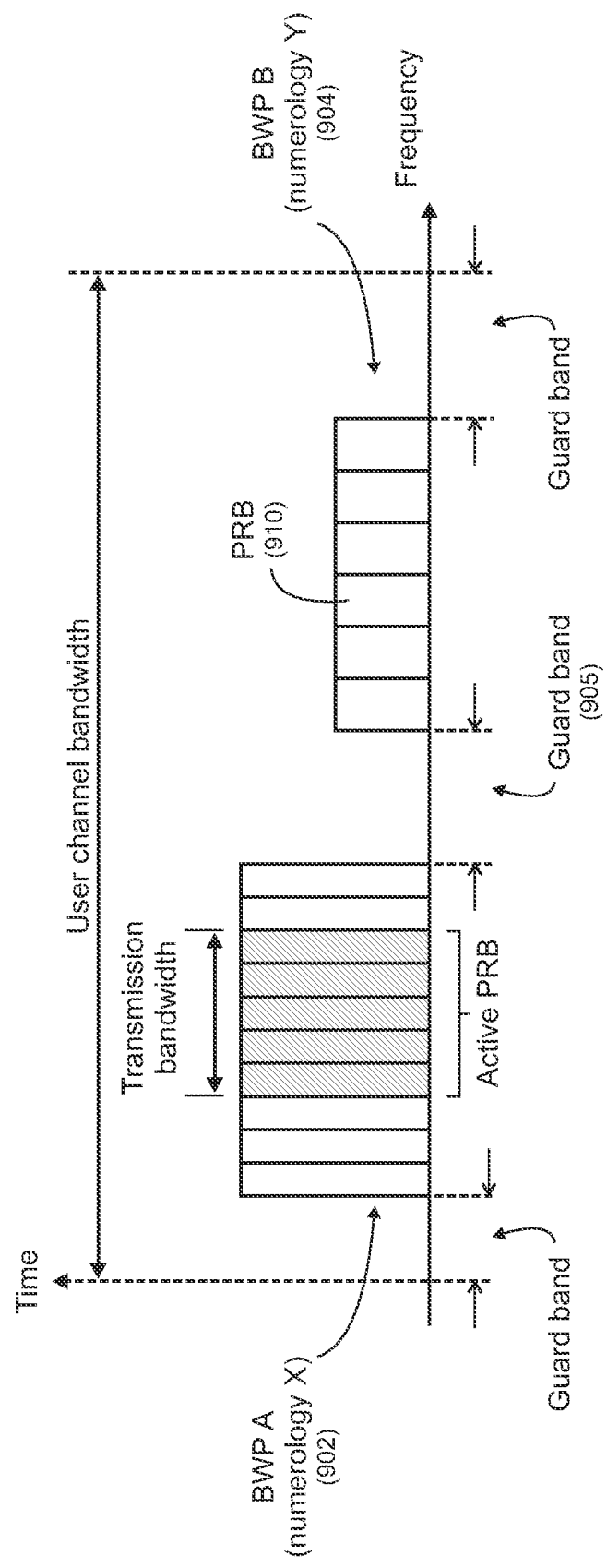
FIG. 9 shows illustrative guard bands between BWPs having different numerologies.

FIG. 9 shows details of illustrative guard bands (as representatively indicated by reference numeral 905) between BWPs 902 and 904 having different numerologies. Based on the relevant 3GPP standards, each numerology has a defined minimum and maximum number of PRBs (as representatively indicated by reference numeral 910). PRB bandwidth is not fixed, as it is in 4G, but is instead dependent on subcarrier spacing which varies by numerology in 5G. As shown, the overall usable channel bandwidth for UE data transmission is negatively impacted by the bandwidth associated with the guard bands. That is, guard band bandwidth is subtracted from the overall bandwidth to arrive at an effective maximum transmission bandwidth.

FIG. 10 shows an illustrative example of standard guard band bandwidths for different subcarrier spacing (SCS) as described in 3rd Generation Partnership Project (3GPP) TS 38.101-1 V18.1.0 (2023-03). The guard band optimizer operates to optimize the bandwidth for guard bands so that some of the standard guard bands can be reduced in size and the saved bandwidth contributed for data transmission in the network.

FIG. 11 is a flowchart showing an illustrative algorithm 1100 for optimizing guard bands based on SINR measurements made at a gNB. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1105, the guard band optimizer receives SINR measurements from the gNB over an E2 interface. The SINR measurements are typically dynamically performed at the gNB on a per user and/or per UE basis. At block 1110, the guard band optimizer derives SINR measurements for different combinations of PRB allocations and guard band size to estimate network throughput. At block 1115, based on the estimates, the guard band optimizer allocates PRBs for users over the E2 interface and sets corresponding guard band size to maximize network throughput.

Figure 12:
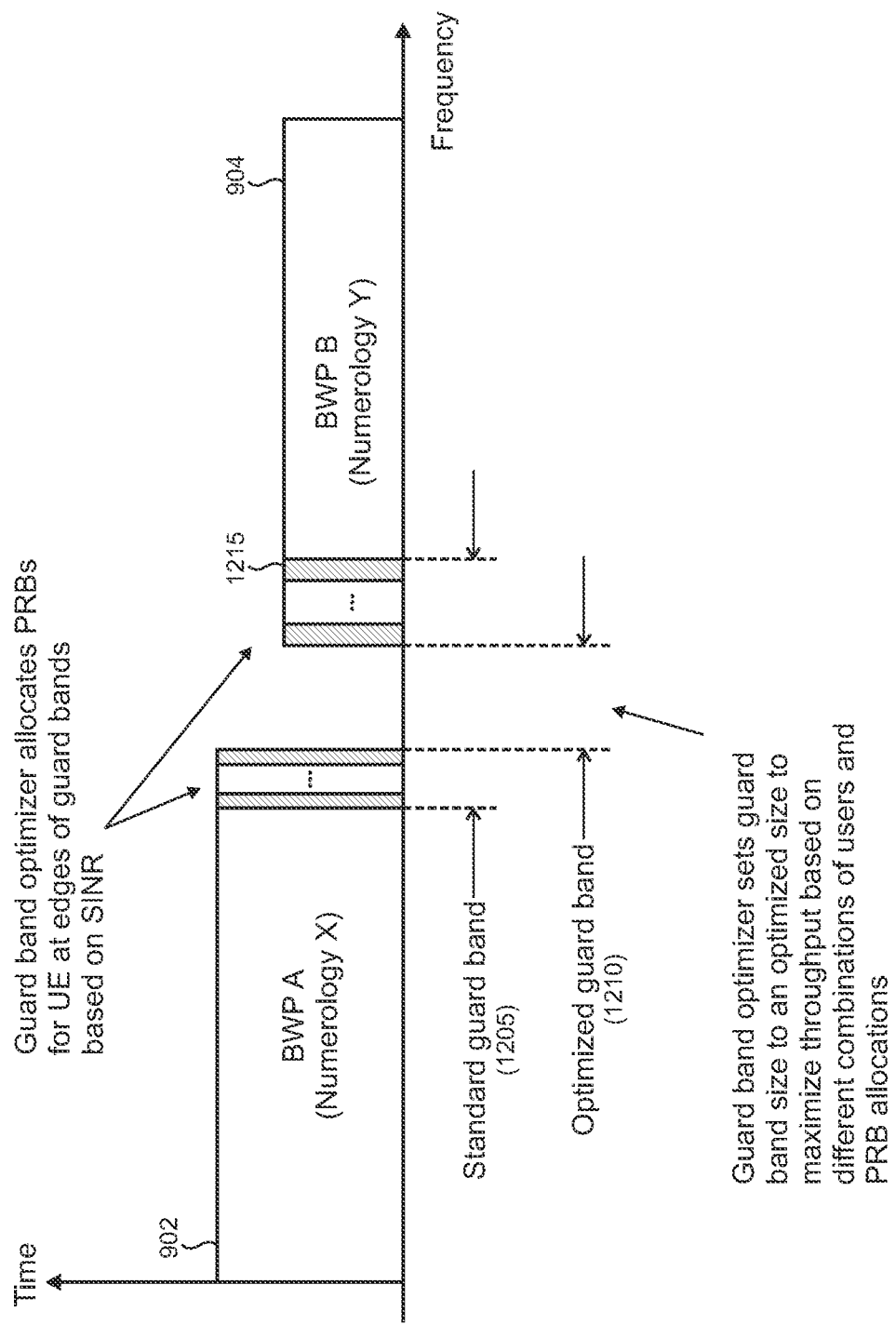
FIG. 12 shows an illustrative implementation of guard band optimization in accordance with the present disclosure.

FIG. 12 shows an illustrative implementation of guard band optimization in accordance with the performance of the algorithm shown in FIG. 11 and discussed above. As shown, one or more of the BWPs 902 and 904 are modified with increased bandwidth that comes at the expense of a reduction in guard band bandwidth from a standard guard band 1205 (e.g., as described by 3GPP) to create a narrower, optimized guard band 1210. In addition, to optimize guard band bandwidth, the guard band optimizer 705 (FIG. 7) uses the received SINR measurements to identify users/UE with high signal strength. PRBs for the users/UE are then allocated, as representatively indicated by reference numeral 1215, to the modified BWPs to mitigate against any increase in INI caused by the guard band bandwidth optimization.

Figure 13:
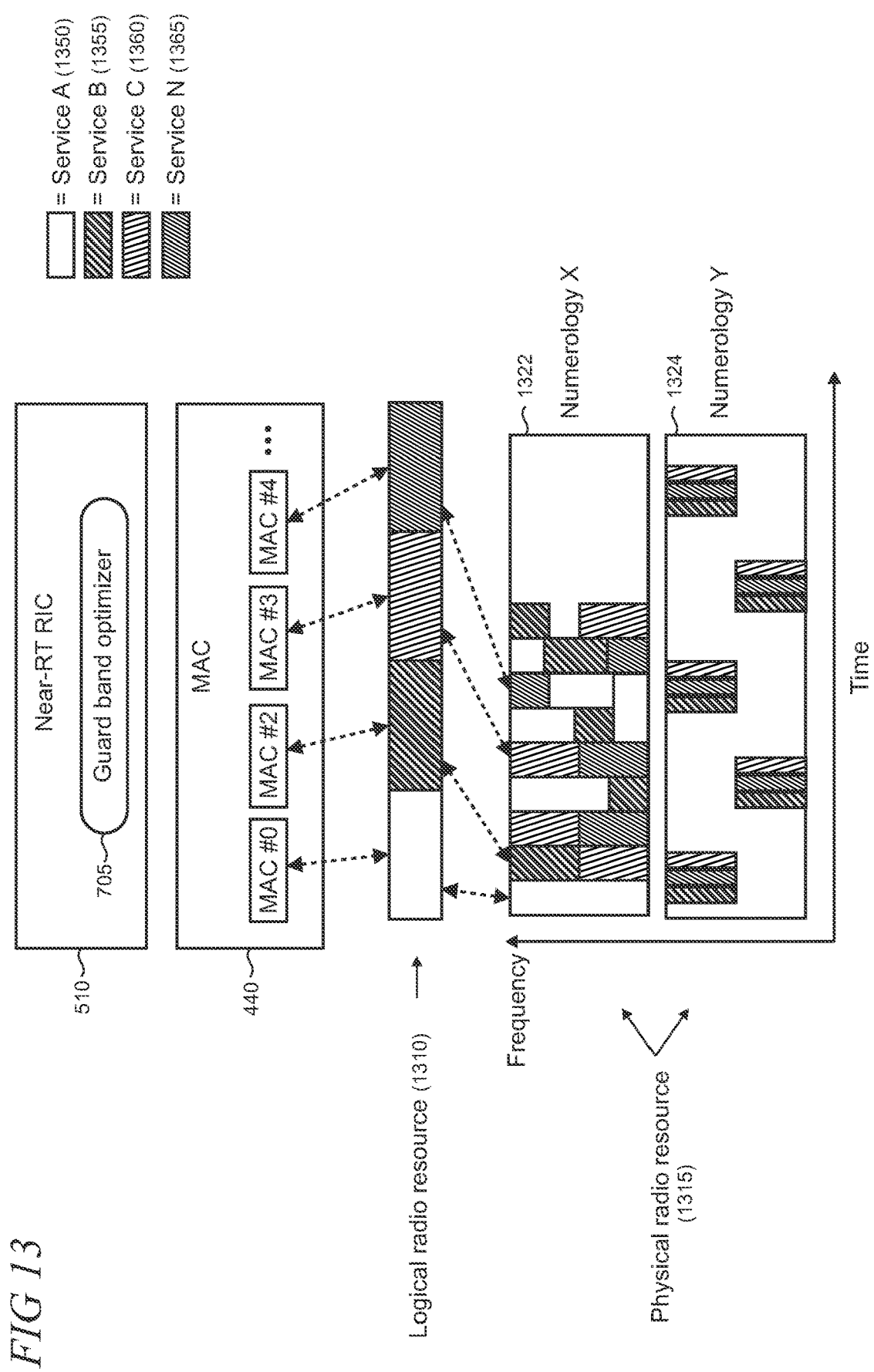
FIG. 13 shows an illustrative guard band optimizer scheduling time slots and subcarriers for transmissions for various services and/or user equipment (UE) optimization in accordance with the present disclosure.

FIG. 13 shows the guard band optimizer 705 as illustratively configured to allocate physical radio resources 1315 among numerologies 1322 and 1324. The guard band optimizer is instantiated, for example, as a component of the near-RT RIC 510 (FIG. 5) to thereby implement or combine the functionality of the scheduler 435. In alternative implementations, part of the guard band optimizer may be distributed outside the near-RT RIC, for example, in a CU in an edge or metro DC, or included in one or more other functional elements of the 5G network architecture.

The guard band optimizer 705 is arranged to control operations of the MAC component 440 based on logical representations 1310 of a radio resource in the PHY component 420 (FIG. 4). As shown, the MAC component 440 performs PRB allocation among the BWPs. More specifically, the physical radio resource 1315 is partitioned into multiple blocks or segments each defined by one numerology to meet certain communication requirements, such as low latency, wide coverage, etc., for various services 1350, 1355, 1360, and 1365 and/or users, applications or the like that are implemented, in this illustrative example using separate 5G slices. As noted above, numerology refers to the values of the basic physical transmission parameters, particularly including, for example, the transmission time slot length in which length of the slot is shorter for higher numerologies and subcarrier spacing.

Subsets of physical resources taken from one or multiple numerology segments are represented, as shown in FIG. 13, using dimensions comprising frequency and time. In 5G, frame structures of the radio resources in the time domain are 10 ms in length irrespective of the numerology in use but may vary in width in the frequency domain. For example, an automotive service in a high mobility scenario may use a wider subcarrier spacing to combat high Doppler shifts, while a latency-sensitive service such as real-time gaming may use fewer symbols in each sub-frame. It may be appreciated that spatial multiplexing, referred to as MIMO (multiple input, multiple output), may also be utilized to provide additional layers of physical resources that the guard band optimizer 705 may allocate in some implementations.

Figure 14:
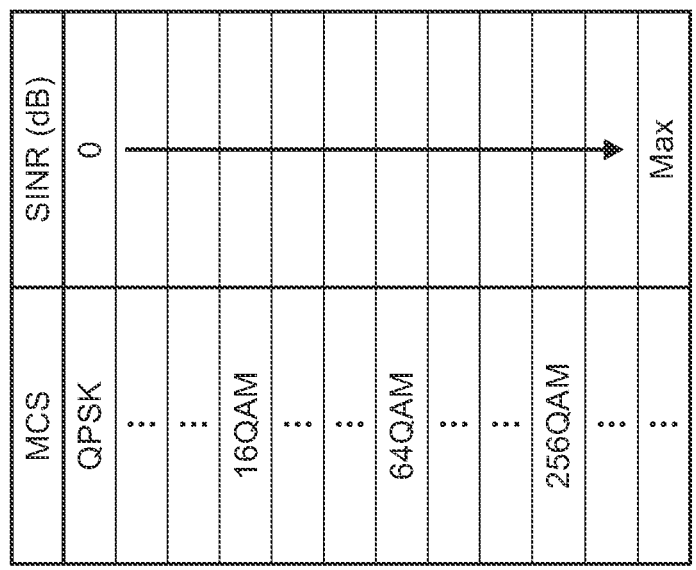
FIG. 14 shows an illustrative modulation coding scheme (MCS) table.

The guard band optimizer 705 applies one or more of various modulation coding schemes (MCS) when controlling data transmissions to and from the gNB based on received SINR measurements made at the gNB. FIG. 14 shows an illustrative MCS table 1400 that shows how increasing SINR can enable higher data encoding rates. The particular SINR thresholds for each MSC can vary by use case and implementation and thus no actual values are shown in the table.

Figure 15:
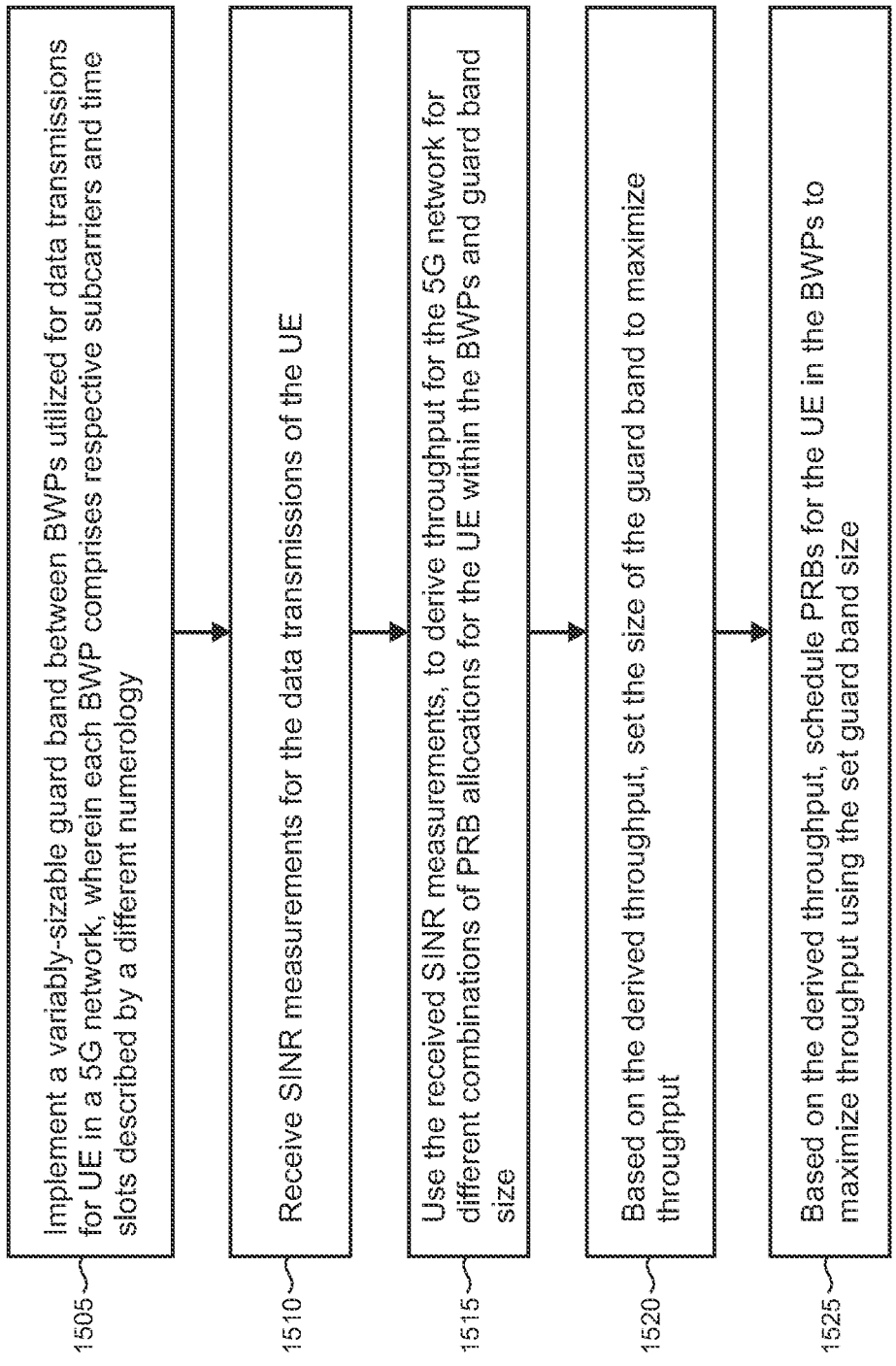
FIGS. 15, 16, and 17 show illustrative methods that may be performed when implementing the present optimization of guard bands in multi-numerology 5G networks.

FIG. 15 is a flowchart of an illustrative method 1500 that may be performed in a 5G network for optimizing the size of a guard band in a 5G network. Method 1500 may be performed, for example, by the guard band optimizer 705 (FIG. 7) or by another suitable component or functionality disposed in the near-RT RIC 510 (FIG. 5).

Block 1505 includes implementing a variably-sizable guard band between BWPs utilized for data transmissions for UE in a 5G network, in which each BWP comprises respective subcarriers and time slots described by a different numerology. Block 1510 includes receiving SINR measurements for the data transmissions of the UE. Block 1515 includes using the received SINR measurements, to derive throughput for the 5G network for different combinations of PRB allocations for the UE within the BWPs and guard band size.

Block 1520 includes, based on the derived throughput, setting the size of the guard band to maximize throughput. Block 1525 includes, based on the derived throughput, scheduling PRBs for the UE in the BWPs to maximize throughput using the set guard band size.

Figure 16:
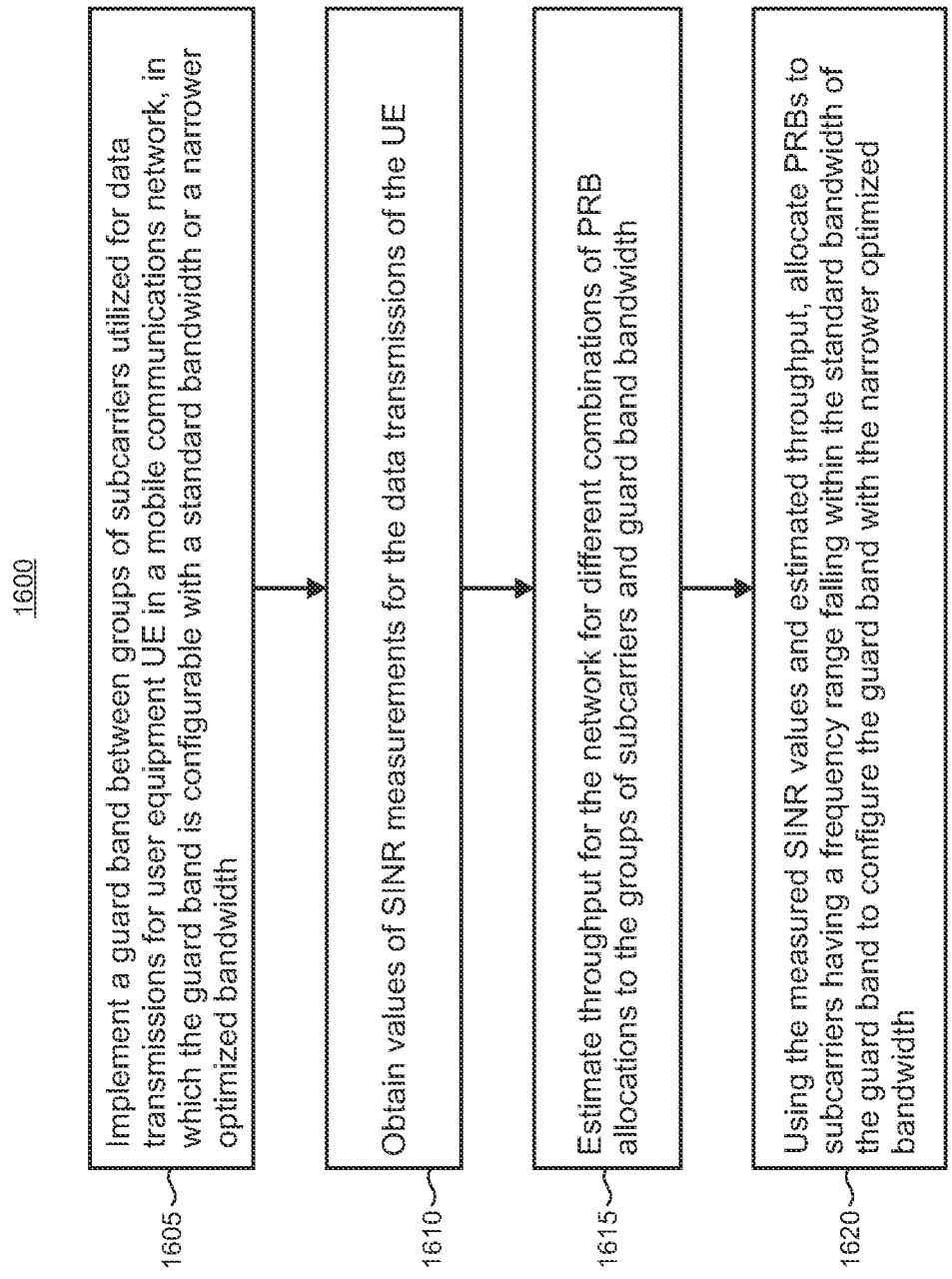

FIG. 16 is a flowchart of an illustrative method 1600 that may be performed in a mobile communications network such as a 4G LTE (fourth generation long term evolution) or 5G network. Method 1600 may be performed, for example, by the guard band optimizer 705 (FIG. 7) or by another suitable component or functionality disposed in the near-RT RIC 510 (FIG. 5).

Block 1605 includes implementing a guard band between groups of subcarriers utilized for data transmissions for user equipment UE in a mobile communications network, in which the guard band is configurable with a standard bandwidth or a narrower optimized bandwidth. Block 1610 includes obtaining values of SINR measurements for the data transmissions of the UE.

Block 1615 includes estimating throughput for the network for different combinations of PRB allocations to the groups of subcarriers and guard band bandwidth. Block 1620 includes, using the measured SINR values and estimated throughput, allocating PRBs to subcarriers having a frequency range falling within the standard bandwidth of the guard band to configure the guard band with the narrower optimized bandwidth.

Figure 17:
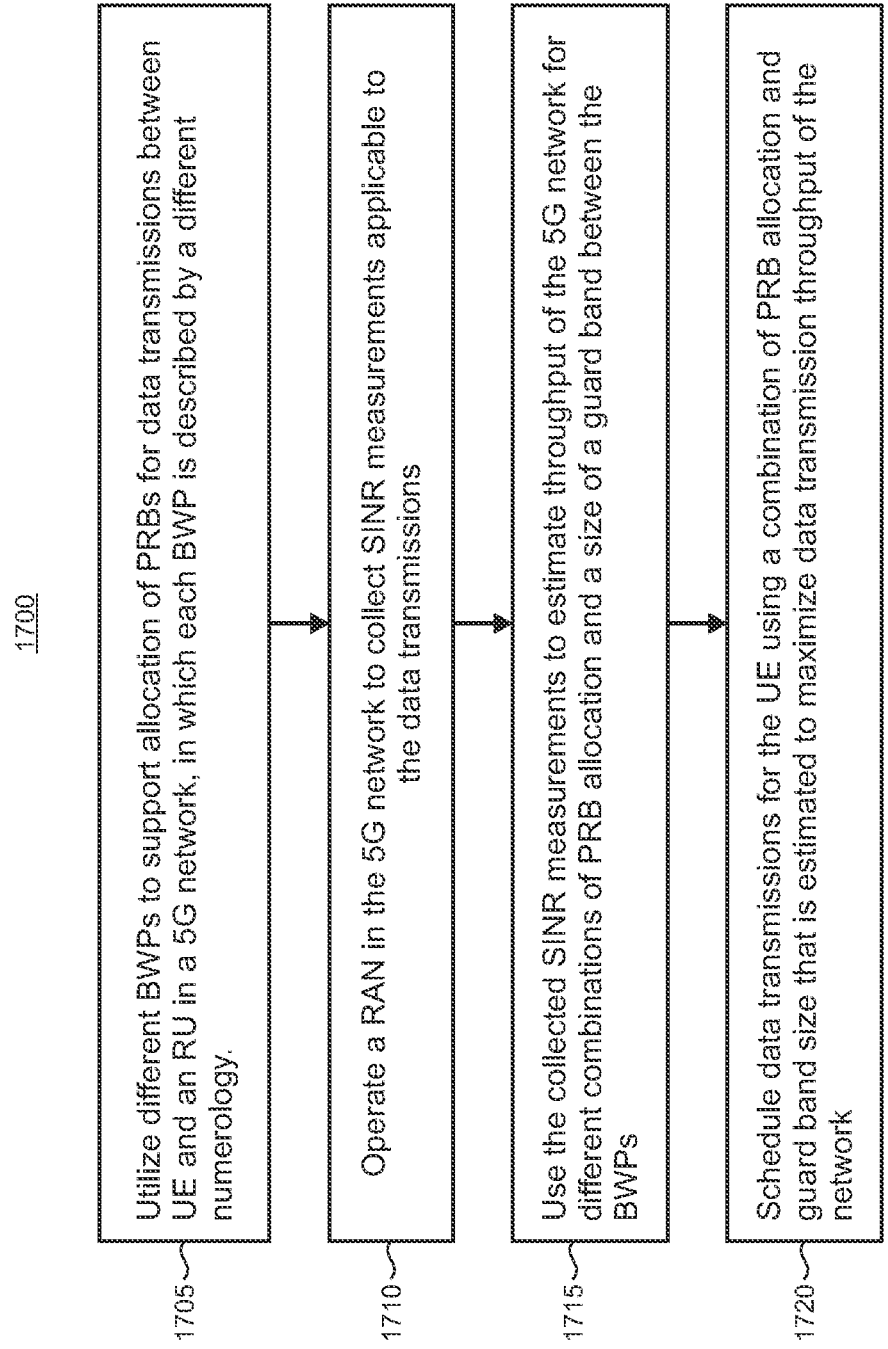

FIG. 17 is a flowchart of an illustrative method 1700 that may be performed by a computing device in a 5G network, for example, a server in a datacenter. Method 1700 may be performed in part, for example, by the guard band optimizer 705 (FIG. 7) or by another suitable component or functionality disposed in the near-RT RIC 510 (FIG. 5).

Block 1705 includes utilizing different BWPs to support allocation of PRBs for data transmissions between UE and an RU in a 5G network, in which each BWP is described by a different numerology. Block 1710 includes operating a RAN in the 5G network to collect SINR measurements applicable to the data transmissions.

Block 1715 includes using the collected SINR measurements to estimate throughput of the 5G network for different combinations of PRB allocation and a size of a guard band between the BWPs. Block 1720 includes scheduling data transmissions for the UE using a combination of PRB allocation and guard band size that is estimated to maximize data transmission throughput of the network.

Figure 18:
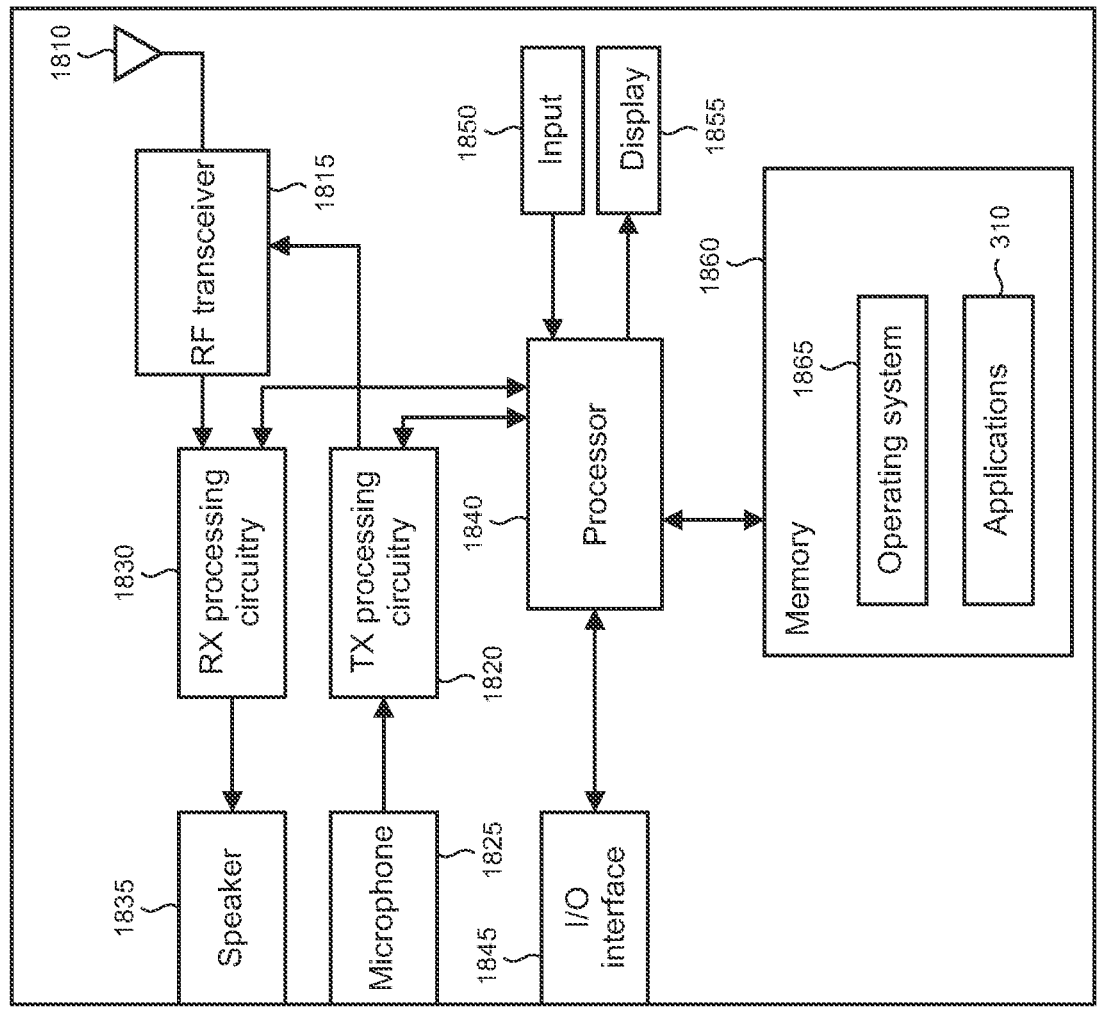
FIG. 18 is a block diagram of an illustrative UE that may be used at least in part to implement the present optimization of guard bands in multi-numerology 5G networks.

FIG. 18 is a block diagram of an illustrative UE 200 that may be used at least in part to implement the present optimization of guard bands in multi-numerology 5G networks. The embodiment of the UE 200 shown in FIG. 18 is for illustration only, and the UEs 200 shown in the drawings and described herein may have the same or similar configuration. However, it is noted that UEs may come in a wide variety of configurations, and FIG. 18 does not limit the scope of the present disclosure to any particular implementation of a UE.

The UE 200 includes an antenna 1810, a radio frequency (RF) transceiver 1815, transmit (TX) processing circuitry 1820, a microphone 1825, and receive (RX) processing circuitry 1830. The UE 200 also includes a speaker 1835, a processor 1840, an input/output (I/O) interface 1845, an input device 1850, a display 1855, and a memory 1860. The memory includes an operating system (OS) program 1865 and one or more applications 310.

The RF transceiver 1815 receives from the antenna 1810, an incoming RF signal transmitted by a gNB of a 5G network 300 (FIG. 3). The RF transceiver down-converts the incoming RF signal to generate an intermediate frequency (IF) or baseband signal. The IF or baseband signal is sent to the RX processing circuitry 1830, which generates a processed baseband signal by filtering, decoding, and/or digitizing the baseband or IF signal. The RX processing circuitry transmits the processed baseband signal to the speaker 1835 (such as for voice data) or to the processor 1840 for further processing (such as for web browsing data).

The TX processing circuitry 1820 receives analog or digital voice data from the microphone 1825 or other outgoing baseband data (such as web data, e-mail, or interactive video game data) from the processor 1840. The TX processing circuitry 1820 encodes, multiplexes, and/or digitizes the outgoing baseband data to generate a processed baseband or IF signal. The RF transceiver 1815 receives the outgoing processed baseband or IF signal from the TX processing circuitry and up-converts the baseband or IF signal to an RF signal that is transmitted via the antenna.

The processor 1840 can include one or more processors or other processing devices and execute the OS program 1865 stored in the memory 1860 to control the overall operation of the UE 200. For example, the processor may control the reception of forward channel signals and the transmission of reverse channel signals by the RF transceiver 1815, the RX processing circuitry 1830, and the TX processing circuitry 1820 in accordance with well-known principles. In some embodiments, the processor 1840 includes at least one microprocessor or microcontroller.

The processor 1840 may be configured for executing other processes and programs resident in the memory 1860, such as operations for CSI measurement and reporting for systems described in embodiments of the present disclosure. The processor can move data into or out of the memory as required by an executing process. In some embodiments, the processor may be configured to execute the applications 310 based on the OS program 1865 or in response to signals received from gNBs or an operator. The processor is also coupled to the I/O interface 1845, which provides the UE 200 with the ability to connect to other computing devices such as laptop computers and handheld computers. The I/O interface may thus function as a communication path between such accessories and the processor.

The processor 1840 is also coupled to the input device 1850 (e.g., keypad, touchscreen, buttons etc.) and the display 1855. A user of the UE 200 can typically employ the input device to enter data into the UE. For example, the display can be a liquid crystal display or other display capable of rendering text and/or graphics, video, etc., from web sites, applications and/or service providers.

The memory 1860 is coupled to the processor 1840. Part of the memory may include a random access memory (RAM), and another part of the memory may include a Flash memory or other read-only memory (ROM).

As described in more detail below, the UE 200 can perform signaling and calculation for CSI reporting. Although FIG. 18 shows one illustrative example of UE 200, it may be appreciated that various changes may be made to the drawing. For example, various components may be combined, further subdivided, or omitted and additional components may be added according to particular needs. As a particular example, the processor 1840 may be divided into multiple processors, such as one or more central processing units (CPUs) and one or more graphics processing units (GPUs). Also, while FIG. 18 depicts the UE 200 as configured as a mobile device, such as a smartphone, UEs may be configured to operate as other types of portable or stationary devices.

Figure 19:
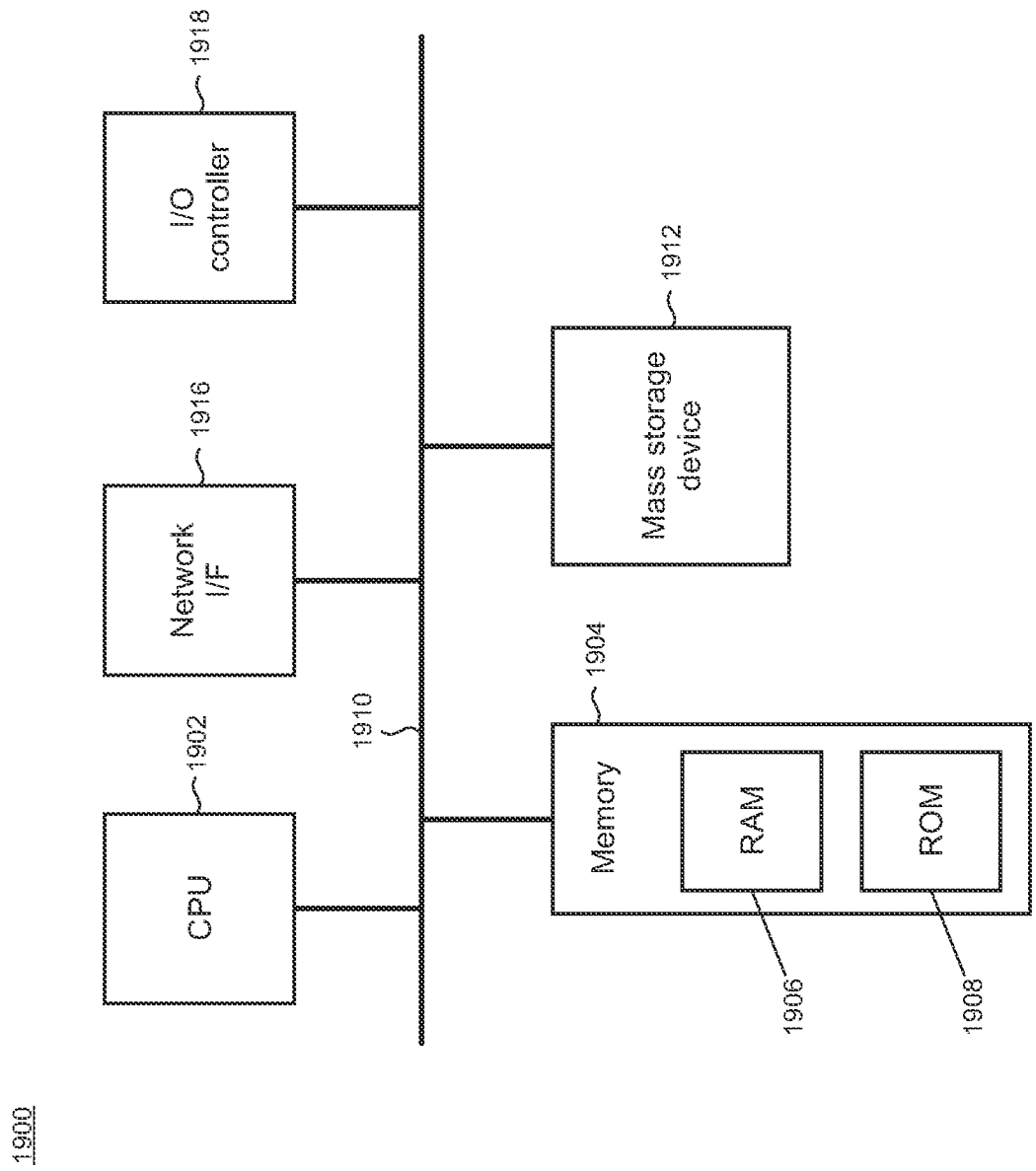
FIG. 19 is a block diagram of an illustrative server or computing device that may be used at least in part to implement the present optimization of guard bands in multi-numerology 5G networks.

FIG. 19 shows an illustrative architecture 1900 for a computing device, such as a server, capable of executing the various components described herein for optimization of guard bands in multi-numerology 5G networks. The architecture 1900 illustrated in FIG. 19 includes one or more processors 1902 (e.g., central processing unit, dedicated AI chip, graphics processing unit, etc.), a system memory 1904, including RAM (random access memory) 1906 and ROM (read only memory) 1908, and a system bus 1910 that operatively and functionally couples the components in the architecture 1900. A basic input/output system containing the basic routines that help to transfer information between elements within the architecture 1900, such as during startup, is typically stored in the ROM 1908. The architecture 1900 further includes a mass storage device 1912 for storing software code or other computer-executed code that is utilized to implement applications, the file system, and the operating system. The mass storage device 1912 is connected to the processor 1902 through a mass storage controller (not shown) connected to the bus 1910. The mass storage device 1912 and its associated computer-readable storage media provide non-volatile storage for the architecture 1900. Although the description of computer-readable storage media contained herein refers to a mass storage device, such as a hard disk or CD-ROM drive, it may be appreciated by those skilled in the art that computer-readable storage media can be any available storage media that can be accessed by the architecture 1900.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1900.

According to various embodiments, the architecture 1900 may operate in a networked environment using logical connections to remote computers through a network. The architecture 1900 may connect to the network through a network interface unit 1916 connected to the bus 1910. It may be appreciated that the network interface unit 1916 also may be utilized to connect to other types of networks and remote computer systems. The architecture 1900 also may include an input/output controller 1918 for receiving and processing input from a number of other devices, including a keyboard, mouse, touchpad, touchscreen, control devices such as buttons and switches or electronic stylus (not shown in FIG. 19). Similarly, the input/output controller 1918 may provide output to a display screen, user interface, a printer, or other type of output device (also not shown in FIG. 19).

It may be appreciated that the software components described herein may, when loaded into the processor 1902 and executed, transform the processor 1902 and the overall architecture 1900 from a general-purpose computing system into a special-purpose computing system customized to facilitate the functionality presented herein. The processor 1902 may be constructed from any number of transistors or other discrete circuit elements, which may individually or collectively assume any number of states. More specifically, the processor 1902 may operate as a finite-state machine, in response to executable instructions contained within the software modules disclosed herein. These computer-executable instructions may transform the processor 1902 by specifying how the processor 1902 transitions between states, thereby transforming the transistors or other discrete hardware elements constituting the processor 1902.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1900 in order to store and execute the software components presented herein. It also may be appreciated that the architecture 1900 may include other types of computing devices, including wearable devices, handheld computers, embedded computer systems, smartphones, PDAs, and other types of computing devices known to those skilled in the art. It is also contemplated that the architecture 1900 may not include all of the components shown in FIG. 19, may include other components that are not explicitly shown in FIG. 19, or may utilize an architecture completely different from that shown in FIG. 19.

Figure 20:
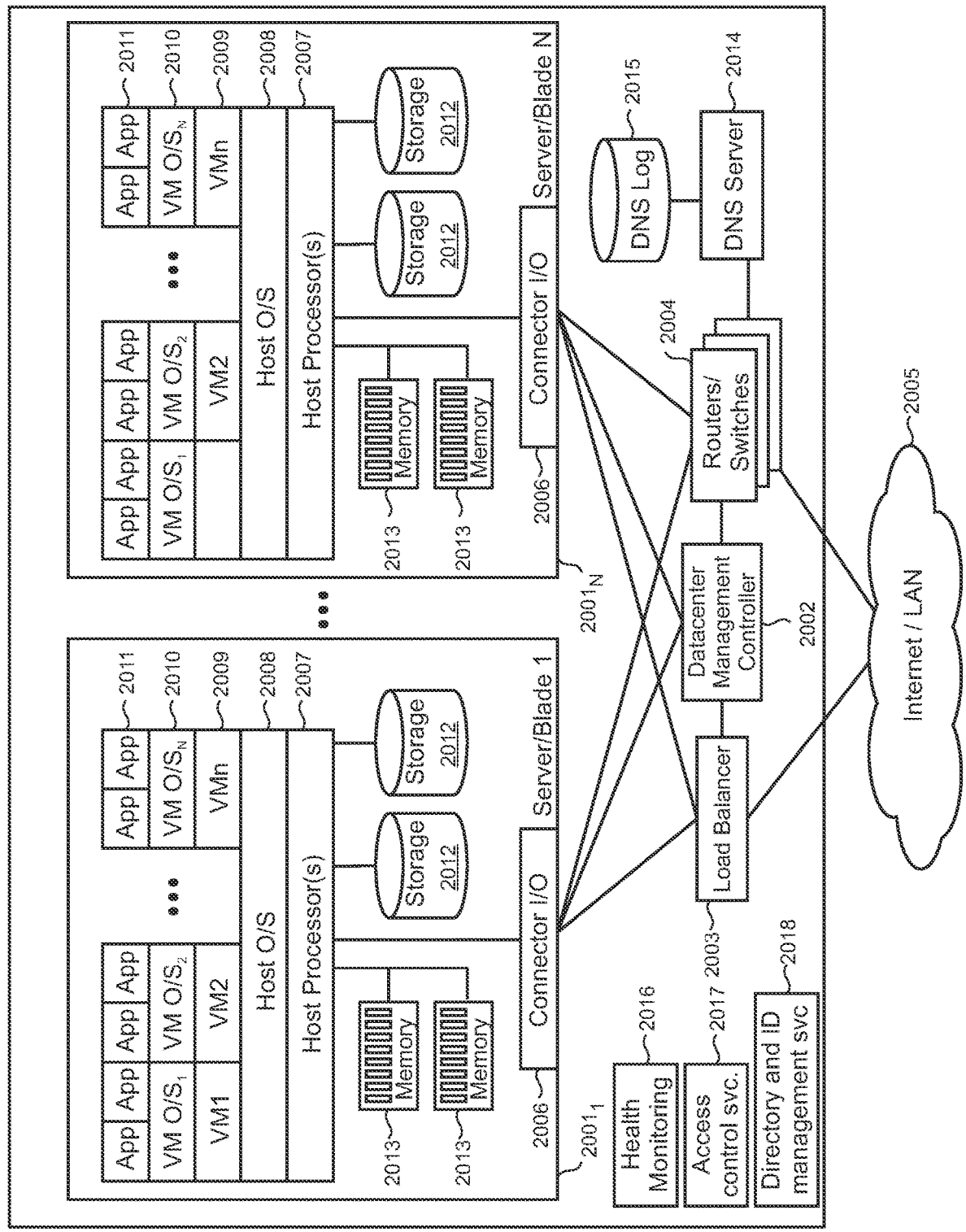
FIG. 20 is a block diagram of an illustrative datacenter that may be used at least in part to implement the present optimization of guard bands in multi-numerology 5G networks.

FIG. 20 is a high-level block diagram of an illustrative datacenter 2000 that provides cloud computing services or distributed computing services that may be used to implement the present optimization of guard bands in multi-numerology 5G networks. Datacenter 2000 may incorporate one or more of the features disclosed in the DCs shown in the drawings and disclosed in the accompanying text. A plurality of servers 2001 are managed by datacenter management controller 2002. Load balancer 2003 distributes requests and computing workloads over servers 2001 to avoid a situation wherein a single server may become overwhelmed. Load balancer 2003 maximizes available capacity and performance of the resources in datacenter 2000. Routers/switches 2004 support data traffic between servers 2001 and between datacenter 2000 and external resources and users (not shown) via an external network 2005, which may be, for example, a local area network (LAN) or the Internet.

Servers 2001 may be standalone computing devices, and/or they may be configured as individual blades in a rack of one or more server devices. Servers 2001 have an input/output (I/O) connector 2006 that manages communication with other database entities. One or more host processors 2007 on each server 2001 run a host operating system (O/S) 2008 that supports multiple virtual machines (VM) 2009. Each VM 2009 may run its own O/S so that each VM O/S 2010 on a server is different, or the same, or a mix of both. The VM O/Ss 2010 may be, for example, different versions of the same O/S (e.g., different VMs running different current and legacy versions of the Windows® operating system). In addition, or alternatively, the VM O/Ss 2010 may be provided by different manufacturers (e.g., some VMs running the Windows® operating system, while other VMs are running the Linux® operating system). Each VM 2009 may also run one or more applications (App) 2011. Each server 2001 also includes storage 2012 (e.g., hard disk drives (HDD)) and memory 2013 (e.g., RAM) that can be accessed and used by the host processors 2007 and VMs 2009 for storing software code, data, etc. In one embodiment, a VM 2009 may employ the data plane APIs as disclosed herein.

Datacenter 2000 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2000 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2009 on server $2001_1$ to run their applications 2011. When demand for an application 2011 increases, the datacenter 2000 may activate additional VMs 2009 on the same server $2001_1$ and/or on a new server $2001_N$ as needed. These additional VMs 2009 can be deactivated if demand for the application later drops.

Datacenter 2000 may offer guaranteed availability, disaster recovery, and back-up services. For example, the datacenter may designate one VM 2009 on server $2001_1$ as the primary location for the tenant's application and may activate a second VM 2009 on the same or a different server as a standby or back-up in case the first VM or server $2001_1$ fails. The datacenter management controller 2002 automatically shifts incoming user requests from the primary VM to the back-up VM without requiring tenant intervention. Although datacenter 2000 is illustrated as a single location, it will be understood that servers 2001 may be distributed to multiple locations across the globe to provide additional redundancy and disaster recovery capabilities. Additionally, datacenter 2000 may be an on-premises, private system that provides services to a single enterprise user or may be a publicly accessible, distributed system that provides services to multiple, unrelated customers and tenants or may be a combination of both.

Domain Name System (DNS) server 2014 resolves domain and host names into IP addresses for all roles, applications, and services in datacenter 2000. DNS log 2015 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2016 monitors the health of the physical systems, software, and environment in datacenter 2000. Health monitoring 2016 provides feedback to datacenter managers when problems are detected with servers, blades, processors, or applications in datacenter 2000 or when network bandwidth or communications issues arise.

Access control service 2017 determines whether users are allowed to access particular connections and services provided at the datacenter 2000. Directory and identity management service 2018 authenticates user credentials for tenants on datacenter 2000.

Figure 21:
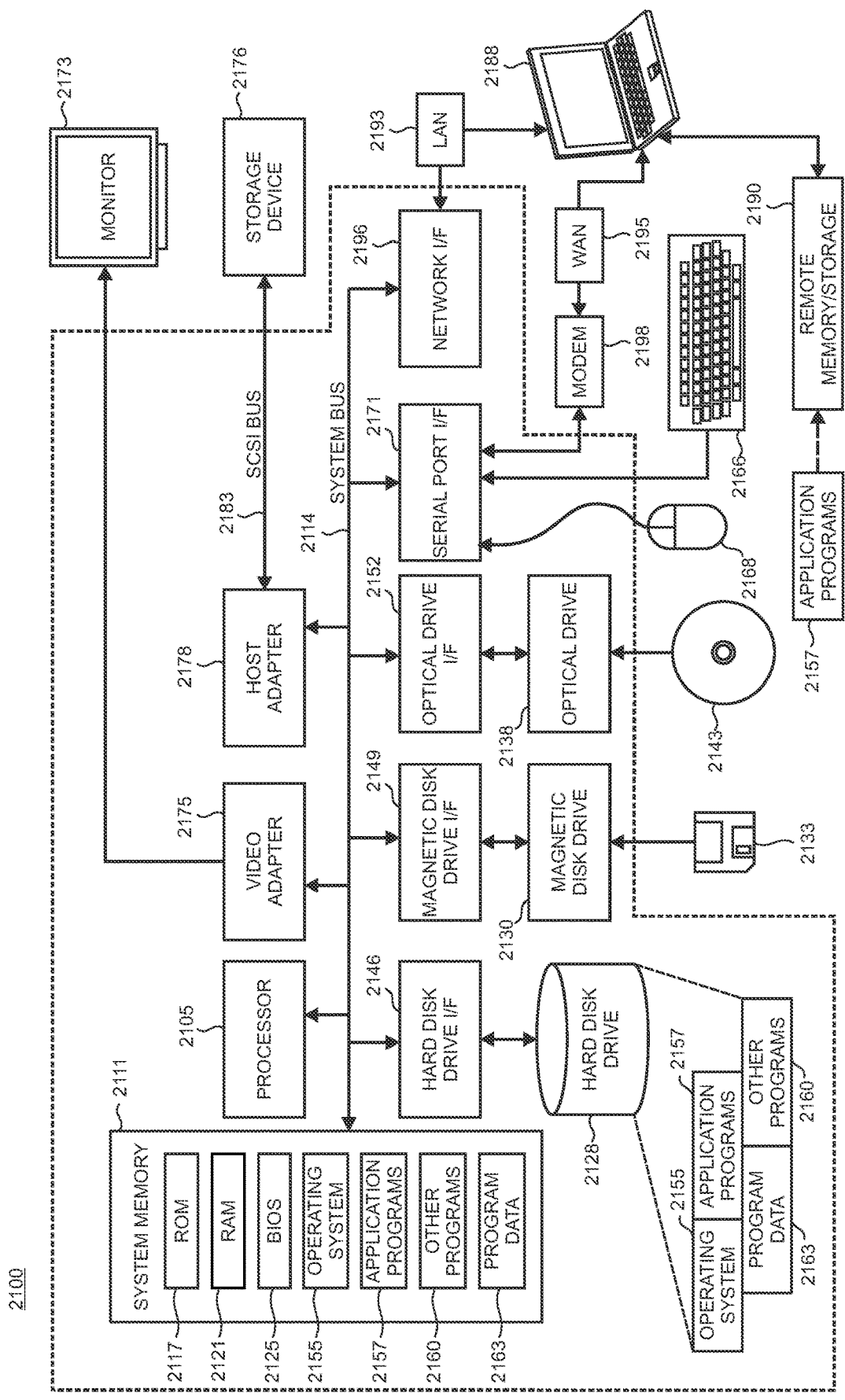
FIG. 21 is a block diagram of an illustrative computer system that may be used at least in part to implement the present optimization of guard bands in multi-numerology 5G networks.

FIG. 21 is a simplified block diagram of an illustrative computer system 2100 such as a PC, client machine, or server with which the present optimization of guard bands in multi-numerology 5G networks. Computer system 2100 includes a processor 2105, a system memory 2111, and a system bus 2114 that couples various system components including the system memory 2111 to the processor 2105. The system bus 2114 may be any of several types of bus structures including a memory bus or memory controller, a peripheral bus, or a local bus using any of a variety of bus architectures. The system memory 2111 includes read only memory (ROM) 2117 and random access memory (RAM) 2121. A basic input/output system (BIOS) 2125, containing the basic routines that help to transfer information between elements within the computer system 2100, such as during startup, is stored in ROM 2117. The computer system 2100 may further include a hard disk drive 2128 for reading from and writing to an internally disposed hard disk (not shown), a magnetic disk drive 2130 for reading from or writing to a removable magnetic disk 2133 (e.g., a floppy disk), and an optical disk drive 2138 for reading from or writing to a removable optical disk 2143 such as a CD (compact disc), DVD (digital versatile disc), or other optical media. The hard disk drive 2128, magnetic disk drive 2130, and optical disk drive 2138 are connected to the system bus 2114 by a hard disk drive interface 2146, a magnetic disk drive interface 2149, and an optical drive interface 2152, respectively. The drives and their associated computer-readable storage media provide non-volatile storage of computer-readable instructions, data structures, program modules, and other data for the computer system 2100. Although this illustrative example includes a hard disk, a removable magnetic disk 2133, and a removable optical disk 2143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present optimization of guard bands in multi-numerology 5G networks. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2133, optical disk 2143, ROM 2117, or RAM 2121, including an operating system 2155, one or more application programs 2157, other program modules 2160, and program data 2163. A user may enter commands and information into the computer system 2100 through input devices such as a keyboard 2166 and pointing device 2168 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2105 through a serial port interface 2171 that is coupled to the system bus 2114, but may be connected by other interfaces, such as a parallel port, game port, or universal serial bus (USB). A monitor 2173 or other type of display device is also connected to the system bus 2114 via an interface, such as a video adapter 2175. In addition to the monitor 2173, personal computers typically include other peripheral output devices (not shown), such as speakers and printers. The illustrative example shown in FIG. 21 also includes a host adapter 2178, a Small Computer System Interface (SCSI) bus 2183, and an external storage device 2176 connected to the SCSI bus 2183.

The computer system 2100 is operable in a networked environment using logical connections to one or more remote computers, such as a remote computer 2188. The remote computer 2188 may be selected as another personal computer, a server, a router, a network PC, a peer device, or other common network node, and typically includes many or all of the elements described above relative to the computer system 2100, although only a single representative remote memory/storage device 2190 is shown in FIG. 21. The logical connections depicted in FIG. 21 include a local area network (LAN) 2193 and a wide area network (WAN) 2195. Such networking environments are often deployed, for example, in offices, enterprise-wide computer networks, intranets, and the Internet.

When used in a LAN networking environment, the computer system 2100 is connected to the local area network 2193 through a network interface or adapter 2196. When used in a WAN networking environment, the computer system 2100 typically includes a broadband modem 2198, network gateway, or other means for establishing communications over the wide area network 2195, such as the Internet. The broadband modem 2198, which may be internal or external, is connected to the system bus 2114 via a serial port interface 2171. In a networked environment, program modules related to the computer system 2100, or portions thereof, may be stored in the remote memory storage device 2190. It is noted that the network connections shown in FIG. 21 are illustrative and other means of establishing a communications link between the computers may be used depending on the specific requirements of an application of the present optimization of guard bands in multi-numerology 5G networks.

Various exemplary embodiments of the present optimization of guard bands in multi-numerology 5G networks are now presented by way of illustration and not as an exhaustive list of all embodiments. An example includes a computer-implemented method for optimizing a size of a guard band, comprising: implementing a variably-sizable guard band between bandwidth parts (BWPs) utilized for data transmissions for user equipment (UE) in a 5G (fifth generation) network, wherein each BWP comprises respective subcarriers and time slots described by a different numerology; receiving SINR (signal-to-interference plus noise ratio) measurements for the data transmissions of the UE; using the received SINR measurements, deriving throughput for the 5G network for different combinations of physical radio block (PRB) allocations for the UE within the BWPs and guard band size; based on the derived throughput, setting the size of the guard band to maximize throughput; and based on the derived throughput, scheduling PRBs for the UE in the BWPs to maximize throughput using the set guard band size.

In another example, the numerologies have different subcarrier spacing, cyclic prefix type, OFDM (orthogonal frequency-division multiplexing) symbol count, radio frame structure, or time slot length. In another example, the scheduled PRBs at edges have stronger measured SINR relative to PRBs that are not scheduled at the edges. In another example, the computer-implemented method further includes transmitting data for the UE based on the scheduling. In another example, the computer-implemented method is performed, at least in part, in a near-real-time radio access network intelligent controller (near-RT RIC) as described by the O-RAN (Open Radio Access Network) Alliance. In another example, the computer-implemented method further includes performing the scheduling using a MAC (Medium Access Control) layer component disposed in a distributed unit (DU) of a 5G RAN (radio access network). In another example, the MAC layer in the DU interoperates with a lower-PHY (physical) layer functionality disposed in a radio unit (RU).

A further example includes one or more hardware-based non-transitory computer-readable memory devices storing computer-executable instructions which, upon execution by one or more processors disposed in a computing device, cause the computing device to: implement a guard band between groups of subcarriers utilized for data transmissions for user equipment (UE) in a mobile communications network, the guard band configurable with a standard bandwidth or a narrower optimized bandwidth; obtain values of SINR (signal-to-interference plus noise ratio) measurements for the data transmissions of the UE; estimate throughput for the network for different combinations of physical resource block (PRB) allocations to the groups of subcarriers and guard band bandwidth; and using the measured SINR values and estimated throughput, allocate PRBs to subcarriers having a frequency range falling within the standard bandwidth of the guard band to configure the guard band with the narrower optimized bandwidth.

In another example, the computer-executable instructions, when executed by the one or more processors, further cause the computing device to determine a UE having a higher SINR value relative to other UE and allocating PRBs for the higher SINR-valued UE to the subcarriers having a frequency range within the standard bandwidth of the guard band. In another example, the computer-executable instructions, when executed by the one or more processors, further cause the computing device to select a modulation coding scheme (MCS) for data transmission based on the SINR values. In another example, the standard bandwidth is a minimum bandwidth as described in 3rd Generation Partnership Project (3GPP) TS 38.101-1 V18.1.0 (2023 March). In another example, the groups of subcarriers have different numerologies. In another example, the mobile communications network comprises a 5G (fifth generation) network.

A further example includes a computing device, comprising: at least one processor; and at least one hardware-based non-transitory computer-readable storage device having computer-executable instructions stored thereon which, when executed by the least one processor, cause the computing device to: utilize different bandwidth parts (BWPs) to support allocation of physical resource blocks (PRBs) for data transmissions between user equipment (UE) and a radio unit (RU) in a 5G (fifth generation) network, wherein each BWP is described by a different numerology; operate a radio access network (RAN) in the 5G network to collect SINR (signal-to-interference plus noise ratio) measurements applicable to the data transmissions; use the collected SINR measurements to estimate throughput of the 5G network for different combinations of PRB allocation and a size of a guard band between the BWPs; and schedule data transmissions for the UE using a combination of PRB allocation and guard band size that is estimated to maximize data transmission throughput of the network.

In another example, each numerology describes at least one of subcarrier spacing, time slot length, or frame structure. In another example, the computer-executable instructions, when executed by the at least one processor, further cause the computing device to implement a guard band optimizer in a near-real-time radio access network intelligent controller (near-RT RIC). In another example, the computer-executable instructions, when executed by the at least one processor, further cause the computing device to establish an E2 interface, in accordance with O-RAN (Open Radio Access Network) Alliance specifications, between the near-RT RIC and gNB in the RAN. In another example, the SINR measurements are received by the near-RT RIC over the E2 interface from the gNB. In another example, the data transmission scheduling is sent from the near-RT RIC over the E2 interface to the gNB. In another example, the computer-executable instructions, when executed by the at least one processor, further cause the computing device to schedule PRBs for a UE that has a higher measured SINR relative to other UE in subcarriers of a BWP that are at an edge of the guard band.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for optimizing a size of a guard band, comprising:
    implementing a variably-sizable guard band between bandwidth parts (BWPs) utilized for data transmissions for user equipment (UE) in a 5G (fifth generation) network, wherein each BWP comprises respective subcarriers and time slots described by a different numerology;
    receiving SINR (signal-to-interference plus noise ratio) measurements for the data transmissions of the UE;
    using the received SINR measurements, deriving throughput for the 5G network for different combinations of physical radio block (PRB) allocations for the UE within the BWPs and guard band size;
    based on the derived throughput, setting the size of the guard band to maximize throughput; and
    based on the derived throughput, scheduling PRBs for the UE in the BWPs to maximize throughput using the set guard band size.

2. The computer-implemented method of claim 1 in which the numerologies have different subcarrier spacing, cyclic prefix type, OFDM (orthogonal frequency-division multiplexing) symbol count, radio frame structure, or time slot length.

3. The computer-implemented method of claim 1 in which the scheduling includes scheduling PRBs for UE in subcarriers of the BWPs at edges of the guard band, in which the scheduled PRBs at edges have stronger measured SINR relative to PRBs that are not scheduled at the edges.

4. The computer-implemented method of claim 3 further including transmitting data for the UE based on the scheduling.

5. The computer-implemented method of claim 1 in which the computer-implemented method is performed, at least in part, in a near-real-time radio access network intelligent controller (near-RT RIC) as described by an O-RAN (Open Radio Access Network) Alliance.

6. The computer-implemented method of claim 1 further including performing the scheduling using a MAC (Medium Access Control) layer component disposed in a distributed unit (DU) of a 5G RAN (radio access network).

7. The computer-implemented method of claim 6 in which the MAC layer in the DU interoperates with a lower-PHY (physical) layer functionality disposed in a radio unit (RU).

8. One or more hardware-based non-transitory computer-readable memory devices storing computer-executable instructions which, upon execution by one or more processors disposed in a computing device, cause the computing device to:

implement a guard band between groups of subcarriers utilized for data transmissions for user equipment (UE) in a mobile communications network, the guard band configurable with a standard bandwidth or a narrower optimized bandwidth;

obtain values of SINR (signal-to-interference plus noise ratio) measurements for the data transmissions of the UE;

estimate throughput for the network for different combinations of physical resource block (PRB) allocations to the groups of subcarriers and guard band bandwidth; and using the measured SINR values and estimated throughput, allocate PRBs to subcarriers having a frequency range falling within the standard bandwidth of the guard band to configure the guard band with the narrower optimized bandwidth.

9. The one or more hardware-based non-transitory computer-readable memory devices of claim 8 in which the computer-executable instructions, when executed by the one or more processors, further cause the computing device to determine a UE having a higher SINR value relative to other UE and allocating PRBs for the higher SINR-valued UE to the subcarriers having a frequency range within the standard bandwidth of the guard band.

10. The one or more hardware-based non-transitory computer-readable memory devices of claim 8 in which the computer-executable instructions, when executed by the one or more processors, further cause the computing device to select a modulation coding scheme (MCS) for data transmission based on the SINR values.

11. The one or more hardware-based non-transitory computer-readable memory devices of claim 8 in which the standard bandwidth is a minimum bandwidth as described in 3rd Generation Partnership Project (3GPP) TS 38.101-1 V18.1.0 (2023 March).

12. The one or more hardware-based non-transitory computer-readable memory devices of claim 8 in which the groups of subcarriers have different numerologies.

13. The one or more hardware-based non-transitory computer-readable memory devices of claim 8 in which the mobile communications network comprises a 5G (fifth generation) network.

14. A computing device, comprising:
at least one processor; and
at least one hardware-based non-transitory computer-readable storage device having computer-executable instructions stored thereon which, when executed by the least one processor, cause the computing device to:

utilize different bandwidth parts (BWPs) to support allocation of physical resource blocks (PRBs) for data transmissions between user equipment (UE) and a radio unit (RU) in a 5G (fifth generation) network, wherein each BWP is described by a different numerology;

operate a radio access network (RAN) in the 5G network to collect SINR (signal-to-interference plus noise ratio) measurements applicable to the data transmissions;

use the collected SINR measurements to estimate throughput of the 5G network for different combinations of PRB allocation and a size of a guard band between the BWPs; and schedule data transmissions for the UE using a combination of PRB allocation and guard band size that is estimated to maximize data transmission throughput of the network.

15. The computing device of claim 14 in which each numerology describes at least one of subcarrier spacing, time slot length, or frame structure.

16. The computing device of claim 14 in which the computer-executable instructions, when executed by the at least one processor, further cause the computing device to implement a guard band optimizer in a near-real-time radio access network intelligent controller (near-RT RIC).

17. The computing device of claim 16 in which the computer-executable instructions, when executed by the at least one processor, further cause the computing device to establish an E2 interface, in accordance with O-RAN (Open Radio Access Network) Alliance specifications, between the near-RT RIC and gNB in the RAN.

18. The computing device of claim 17 in which the SINR measurements are received by the near-RT RIC over the E2 interface from the gNB.

19. The computing device of claim 17 in which the data transmission scheduling is sent from the near-RT RIC over the E2 interface to the gNB.

20. The computing device of claim 19 in which the computer-executable instructions, when executed by the at least one processor, further cause the computing device to schedule PRBs for a UE that has a higher measured SINR relative to other UE in subcarriers of a BWP that are at an edge of the guard band.

\* \* \* \* \*